(12) United States Patent
Chanchlani et al.

(10) Patent No.: US 12,450,943 B2
(45) Date of Patent: Oct. 21, 2025

(54) METHOD AND ELECTRONIC DEVICE FOR IDENTIFYING USER

(71) Applicant: SAMSUNG ELECTRONICS CO., LTD., Suwon-si (KR)

(72) Inventors: Pankaj Chanchlani, Ajmer (IN); Saurabh Kumar Shrivatsava, Noida (IN); Ashwini Kumar Kulshrestha, Noida (IN); Tarun Gupta, Noida (IN); Prabhat Kumar Gupta, Noida (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 348 days.

(21) Appl. No.: 18/199,176

(22) Filed: May 18, 2023

(65) Prior Publication Data

US 2023/0306786 A1    Sep. 28, 2023

Related U.S. Application Data

(63) Continuation of application No. PCT/KR2021/019647, filed on Dec. 22, 2021.

(30) Foreign Application Priority Data

Dec. 23, 2020 (IN) .............................. 202041056132

(51) Int. Cl.
   *G06V 40/16* (2022.01)
   *G06T 3/40* (2024.01)
   (Continued)

(52) U.S. Cl.
   CPC .............. *G06V 40/172* (2022.01); *G06T 3/40* (2013.01); *G06T 5/92* (2024.01); *G06T 7/73* (2017.01);
   (Continued)

(58) Field of Classification Search
   CPC ... G06T 2207/30201; G06T 3/40; G06T 5/92; G06T 7/73; G06V 10/82; G06V 40/171; G06V 40/172; G06V 40/193; G06V 40/40
   See application file for complete search history.

(56) References Cited

U.S. PATENT DOCUMENTS

| | | |
|---|---|---|
| 8,422,746 B2 | 4/2013 | Lee |
| 9,703,939 B2 | 7/2017 | Tahk et al. |

(Continued)

FOREIGN PATENT DOCUMENTS

| | | |
|---|---|---|
| CN | 110633664 A | 12/2019 |
| JP | 6826281 B2 | 2/2021 |
| JP | 6891633 B2 | 6/2021 |

OTHER PUBLICATIONS

International Search Report and Written Opinion issued Apr. 12, 2022 by the International Searching Authority in counterpart International Patent Application No. PCT/KR2021/019647 (PCT/ISA/220 PCT/ISA/210 and PCT/ISA/237).

(Continued)

*Primary Examiner* — Ruiping Li
(74) *Attorney, Agent, or Firm* — Sughrue Mion, PLLC

(57) ABSTRACT

A method for identifying a user of an electronic device, includes: capturing at least one image frame of a portion of the user's face; extracting facial descriptors from the at least one image frame of the portion of the user's face; generating first facial descriptor coordinates by using the facial descriptors; determining a first distance between the first facial descriptor coordinates and second facial descriptor coordinates; resizing the first facial descriptor coordinates at least one of radially and angularly based on the first distance between the first facial descriptor coordinates and the second facial descriptor coordinates, and a weight associated with the facial descriptors used to generate the first facial descriptor coordinates.

20 Claims, 27 Drawing Sheets

(51) Int. Cl.
  *G06T 5/92*    (2024.01)
  *G06T 7/73*    (2017.01)
  *G06V 40/18*   (2022.01)
  *G06V 40/40*   (2022.01)

(52) U.S. Cl.
  CPC .......... *G06V 40/171* (2022.01); *G06V 40/193* (2022.01); *G06V 40/40* (2022.01); *G06T 2207/30201* (2013.01)

(56) References Cited

U.S. PATENT DOCUMENTS

| | | |
|---|---|---|
| 2013/0015946 A1 | 1/2013 | Lau et al. |
| 2013/0148860 A1* | 6/2013 | Musatenko .......... G06V 10/754 |
| | | 382/107 |
| 2019/0058847 A1 | 2/2019 | Mayer et al. |
| 2019/0147156 A1* | 5/2019 | Burri .................... G06V 40/174 |
| | | 713/186 |
| 2019/0174039 A1 | 6/2019 | Jung et al. |
| 2019/0205694 A1 | 7/2019 | Wang et al. |
| 2020/0302623 A1 | 9/2020 | Yan et al. |

OTHER PUBLICATIONS

Communication issued Jul. 11, 2022 by Intellectual Property Office of India in Indian Patent Application No. 202041056132.

* cited by examiner

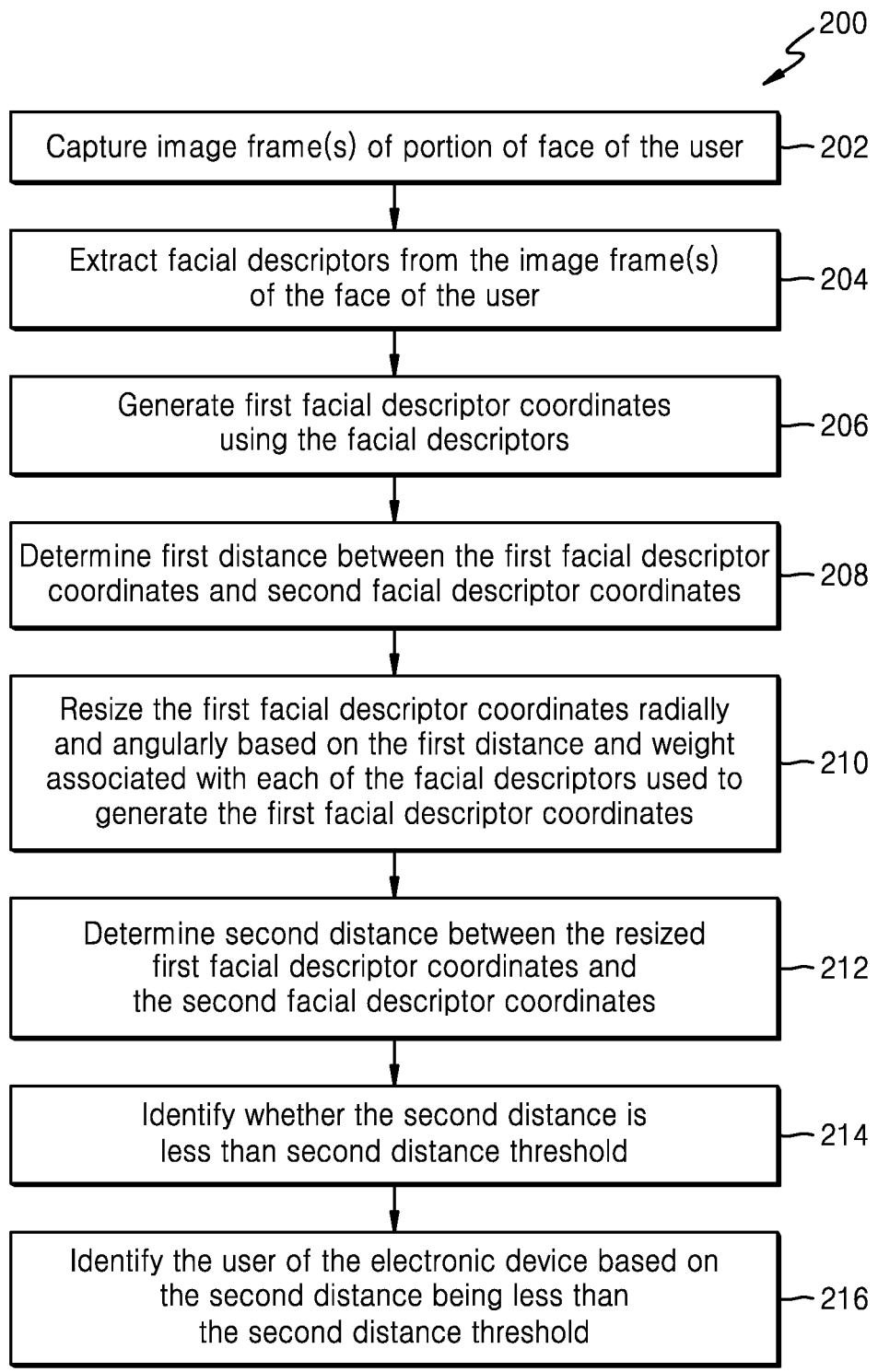

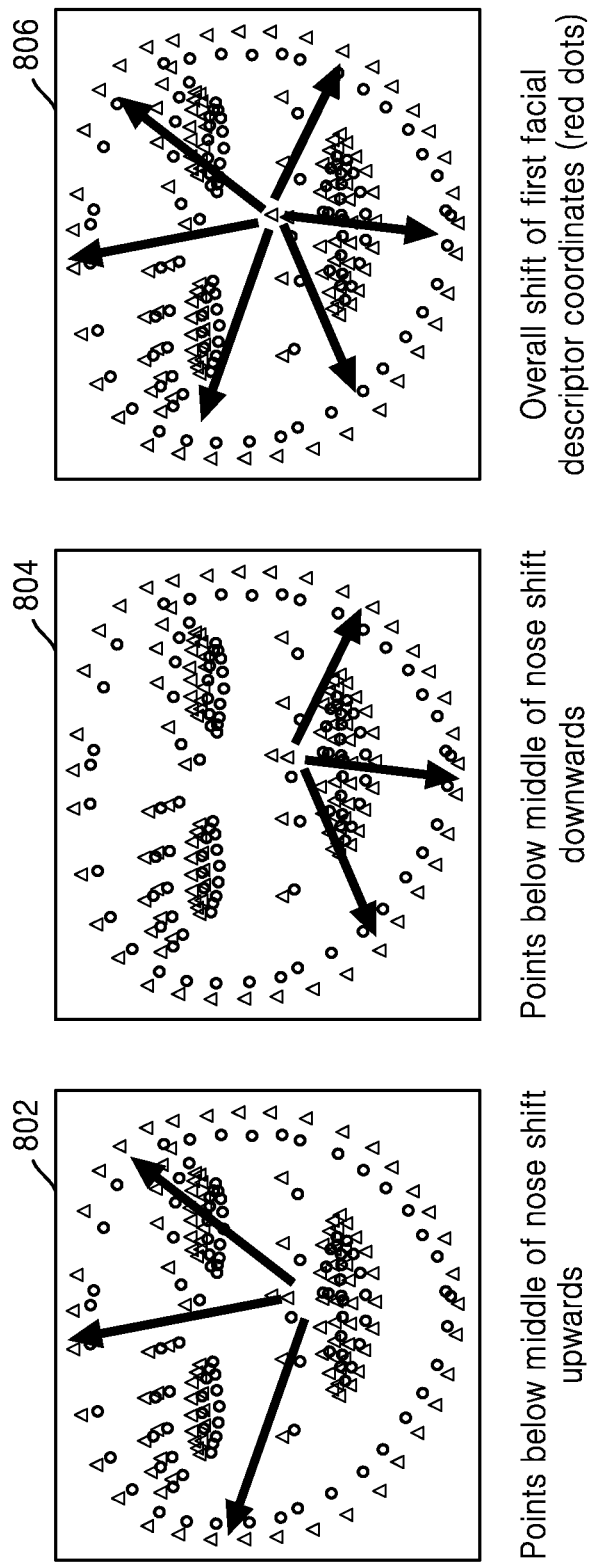

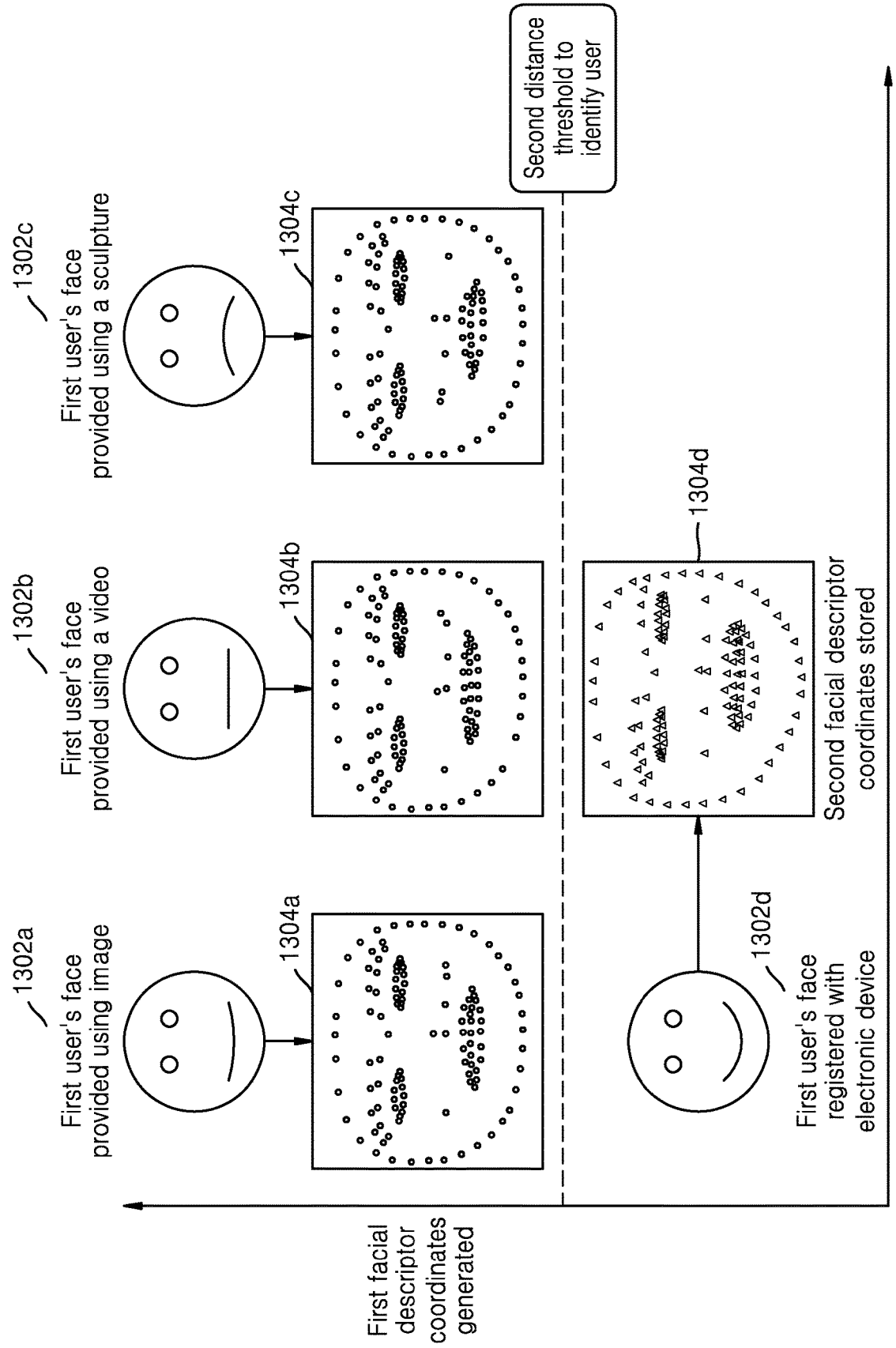

METHOD AND ELECTRONIC DEVICE FOR IDENTIFYING USER

CROSS-REFERENCE TO RELATED APPLICATIONS

This application is a by-pass continuation application of International Application No. PCT/KR2021/019647, filed on Dec. 22, 2021, which based on and claims priority to Indian Patent Application number 202041056132, filed on Dec. 23, 2020, in the Indian Intellectual Property Office, the disclosures of which are incorporated by reference herein in their entireties.

BACKGROUND

1. Field

The disclosure relates to user identification by electronic device, and more particularly, to a method and electronic device for identifying user based on multiple facial descriptors extracted from multiple image frames of a user's face captured by the electronic device.

2. Description of Related Art

In general, technological advancements in electronic devices have led to introduction various techniques by which the electronic devices can recognize an original user and provide access to the electronic devices such as, for example, facial recognition and biometric recognition. In a case of an electronic device identifying the original user based on facial recognition, the electronic device compares a real-time image of face of the original user with a pre-stored image captured at time of registering the original user.

However, the electronic device is not able to address a false detection where another user can mimic the original user by imitating facial expressions of the original user and get access to the electronic device. Also, the electronic device cannot detect if another user reproduce similar facial features like the original user by using a mask, a video with the original user's face, a sculpture of the original user's face, etc. As a result, the false detection by the electronic device can pose security issues and compromises user privacy.

Further, there are instances when the original user does not intend to access the electronic device but the electronic device accidentally unlocks and provides access due to the electronic device performing facial recognition of the original user. For example, the original user is sleeping or inattentive and does not intend to unlock the electronic device but the electronic device may not be able determine the same and the electronic device unlocks. Therefore, the user may feel irritated due to frequent and intended unlocking of the electronic device. Thus, it is desired to address the above mentioned disadvantages or other shortcomings or at least provide a useful alternative.

SUMMARY

Provided are a method and an electronic device for identifying user based on multiple facial descriptors which are extracted from multiple images of a user's face captured by the electronic device. Each of the multiple facial descriptors extracted in real-time are used to generate first facial descriptor coordinates which are then compared with a second facial descriptor coordinates stored in the electronic device. Therefore, the use of first facial descriptor coordinates ensures that the electronic device identifies only the user and not a mimic, a mask or a look-alike of the user.

Further, provided are a method and an electronic device for assigning weights for each of the multiple facial descriptors used to generate the first facial descriptor coordinates. As a result, the facial descriptors which expand and shrink more gradually such as eyebrow, lips etc. are provided higher weightage while generating the first facial descriptor coordinates. Therefore, efficiency of user identification by the electronic device is increased.

According to an aspect of the disclosure, a method for identifying a user of an electronic device, includes: capturing at least one image frame of a portion of a face of the user; extracting facial descriptors from the at least one image frame of the portion of the face of the user; generating first facial descriptor coordinates based on the facial descriptors; determining a first distance between the first facial descriptor coordinates and second facial descriptor coordinates, wherein the second facial descriptor coordinates are generated based on registering the user of the electronic device; resizing the first facial descriptor coordinates at least one of radially and angularly based on the first distance between the first facial descriptor coordinates and the second facial descriptor coordinates, and a weight associated with each of the facial descriptors used to generate the first facial descriptor coordinates; determining a second distance between the resized first facial descriptor coordinates and the second facial descriptor coordinates; identifying whether the second distance between the resized first facial descriptor coordinates and the second facial descriptor coordinates is less than a second distance threshold; and identifying the user of the electronic device based on the second distance between the resized first facial descriptor coordinates and the second facial descriptor coordinates being less than the second distance threshold.

The at least one image frame of the portion of the face of the user may be captured with an environment around the portion of the face of the user, and the portion of the face of the user and the environment around the portion of the face of the user may be differentiated based on at least one of brightness and color composition.

The extracting the facial descriptors from the at least one image frame of the portion of the face of the user may include: enhancing at least one of a quality and a lighting condition associated with the at least one image frame of the portion of the face of the user to generate at least one enhanced image frame of the portion of the face of the user; determining a position and dimension of each of the facial descriptors from the at least one enhanced image frame of the portion of the face of the user; and extracting the facial descriptors from the at least one enhanced image frame of the portion of the face of the user.

The identifying the user of the electronic device may include: determining whether the second distance between the resized first facial descriptor coordinates and the second facial descriptor coordinates is less than the second distance threshold; and identifying the user as one of: genuine, based on determining that the second distance between the resized first facial descriptor coordinates and the second facial descriptor coordinates is greater than the second distance threshold, and not genuine, based on determining that the second distance between the resized first facial descriptor coordinates and the second facial descriptor coordinates is less than the second distance threshold.

The facial descriptors may include at least one of eyes, eyeballs, nose, mouth, ear, forehead, eyebrows, chin, lips, face lob, hair, and cheeks.

The generating the first facial descriptor coordinates may include: obtaining the facial descriptors extracted from the at least one image frame of the portion of the face of the user; combining the facial descriptors associated using a predefined facial coordinate; and generating the first facial descriptor coordinates based on the facial descriptors.

The identifying the user of the electronic device may include: determining a probability of at least one attentiveness feature of the face of the user based on one of: the second distance between the resized first facial descriptor coordinates and the second facial descriptor coordinates being less than the second distance threshold and a distance between an original position of eyeballs of the user and a real-time position of eyeballs of the user; determining a probability of at least one inattentiveness feature of the face of the user based on one of: the second distance between the resized first facial descriptor coordinates and the second facial descriptor coordinates being less than the second distance threshold, and the distance between the original position of eyeballs of the user and the real-time position of eyeballs of the user; determining whether the probability of the at least one attentiveness feature is greater than the probability of the at least one inattentiveness feature; and determining that one of: the face of the user is attentive, in response to determining that the probability of the at least one attentiveness feature is greater than the probability of the at least one inattentiveness feature, and the face of the user is not attentive, in response to determining that the probability of the at least one attentiveness feature is not greater than the probability of the at least one inattentiveness feature.

The identifying the user of the electronic device may include: determining whether that the second distance between the resized first facial descriptor coordinates and the second facial descriptor coordinates is less than the second distance threshold; and identifying that one of: the face of the user is not a facial mimic, based on determining that the second distance between the resized first facial descriptor coordinates and the second facial descriptor coordinates is greater than the second distance threshold, and the face of the user is the facial mimic, based on determining that the second distance between the resized first facial descriptor coordinates and the second facial descriptor coordinates is less than the second distance threshold.

The resizing the first facial descriptor coordinates may include: determining the weight associated with each of the facial descriptors used to generate the first facial descriptor coordinates, based on a position and motion of a facial descriptor with respect to each of other facial descriptors; reshaping the first facial descriptor coordinates radially over the second facial descriptor coordinates based on the first distance and the weight associated with each of the facial descriptors, wherein reshaping is one of expanding a size of the first facial descriptor coordinates and shrinking the size of the first facial descriptor coordinates; determining an angle of rotation of the reshaped first facial descriptor coordinates in comparison to the second facial descriptor coordinates; and resizing the reshaped first facial descriptor coordinates by rotating the reshaped first facial descriptor coordinates using the determined angle of rotation until a facial boundary box of the reshaped first facial descriptor coordinates matches a facial boundary box of the second facial descriptor coordinates.

The first distance may be one of a positive value and a negative value based on a first distance threshold, and the first distance may indicate a position of the user with respect to the electronic device.

The positive value of the first distance may indicate that the position of the user is away from the electronic device and the negative value of the first distance may indicate that the position of the user is close to the electronic device.

According to an aspect of the disclosure, nn electronic device for identifying a user, includes: a memory; a processor coupled to the memory and configured to: capture at least one image frame of a portion of a face of the user; extract facial descriptors from the at least one image frame of the portion of the face of the user; generate first facial descriptor coordinates using the facial descriptors; determine a first distance between the first facial descriptor coordinates and second facial descriptor coordinates, wherein the second facial descriptor coordinates are generated based on registering the user of the electronic device; resize the first facial descriptor coordinates at least one of radially and angularly based on the first distance between the first facial descriptor coordinates and the second facial descriptor coordinates, and a weight associated with each of the facial descriptors used to generate the first facial descriptor coordinates; determine a second distance between the resized first facial descriptor coordinates and the second facial descriptor coordinates; identify whether the second distance between the resized first facial descriptor coordinates and the second facial descriptor coordinates is less than a second distance threshold; and identify the user of the electronic device based on the second distance between the resized first facial descriptor coordinates and the second facial descriptor coordinates being less than the second distance threshold.

The at least one image frame of the portion of the face of the user may be captured with an environment around the portion of the face of the user, and the portion of the face of the user and the environment around the portion of the face of the user may be differentiated based on at least one of brightness and color composition.

The processor may be further configured to extract the facial descriptors from the at least one image frame of the portion of the face of the user by: enhancing at least one of a quality and a lighting condition associated with the at least one image frame of the portion of the face of the user to generate at least one enhanced image frame of the portion of the face of the user; determining a position and dimension of each of the facial descriptors from the at least one enhanced image frame of the portion of the face of the user; and extracting the facial descriptors from the at least one enhanced image frame of the portion of the face of the user.

According to an aspect of the disclosure, a non-transitory computer-readable recording medium has recorded thereon a program that is executed by a processor to perform the method.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2 is a flow chart illustrating the method for identifying the user of the electronic device, according to one or more embodiments;

FIG. 8A illustrates resizing the first facial descriptor coordinates radially based on the first distance and the weight associated with the facial descriptors by the electronic device, according to one or more embodiments;

FIG. 13A are examples illustrating the first facial descriptor coordinates generated for the user in various scenarios by the electronic device, according to one or more embodiments.

DETAILED DESCRIPTION

Figure 1A:
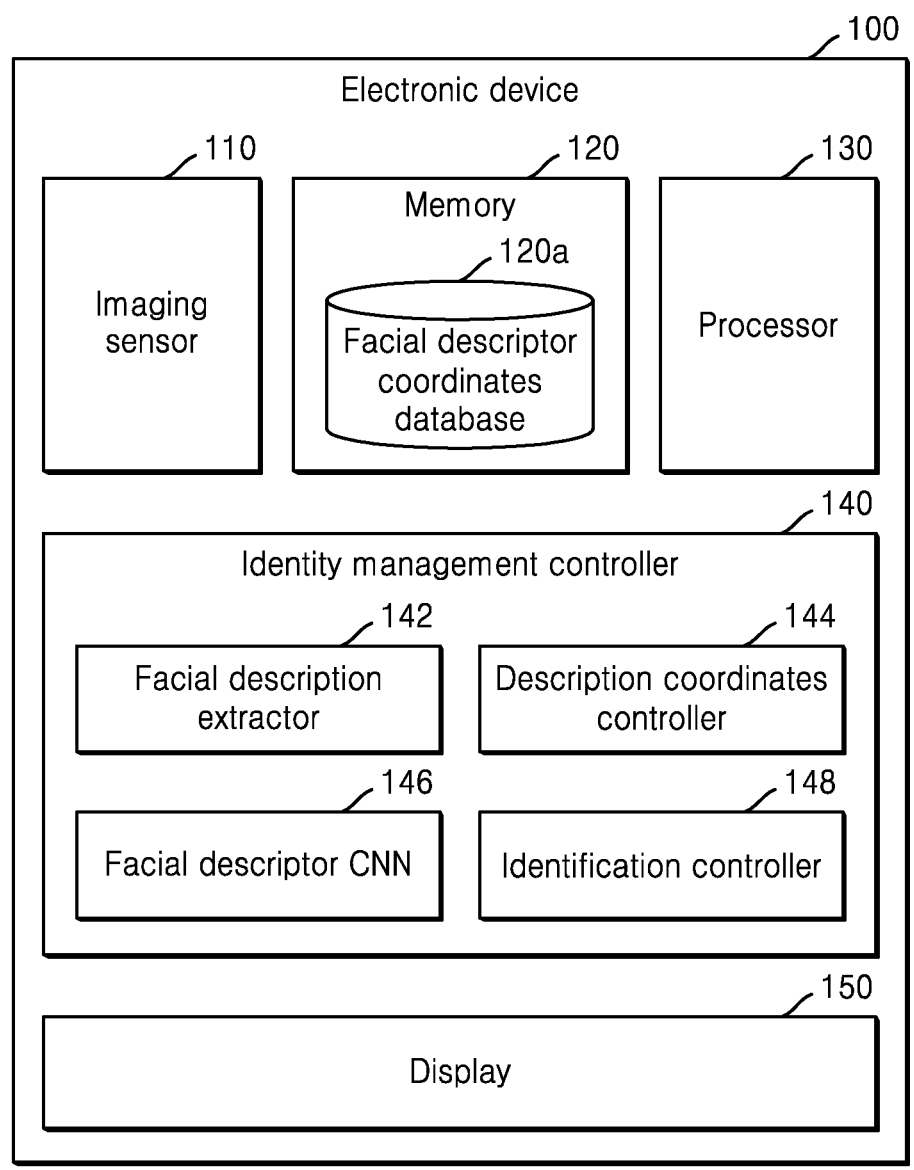
FIG. 1A is a block diagram of an electronic device for identifying a user, according to one or more embodiments.

Various embodiments of the disclosure and various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein disclose a method for identifying user of an electronic device. The method includes capturing, by the electronic device, image frame(s) of a portion of the user's face and extracting, by the electronic device, facial descriptors from the image frame(s) of the portion of the user's face. Further, the method includes generating, by the electronic device, first facial descriptor coordinates using the facial descriptors and determining, by the electronic device, a first distance between the first facial descriptor coordinates and second facial descriptor coordinates. The second facial descriptor coordinates is generated based on registering the user of the electronic device. Further, the method also includes resizing, by the electronic device, the first facial descriptor coordinates radially and angularly based on the first distance between the first facial descriptor coordinates and the second facial descriptor coordinates and a weight associated with each of the facial descriptors used to generate the first facial descriptor coordinates. Further, the method includes determining, by the electronic device, a second distance between the resized first facial descriptor coordinates and the second facial descriptor coordinates. Further, the method includes identifying, by the electronic device, whether the second distance between the resized first facial descriptor coordinates and the second facial descriptor coordinates is less than a second distance threshold; and identifying, by the electronic device, the user of the electronic device based on the second distance between the resized first facial descriptor coordinates and the second facial descriptor coordinates being less than the second distance threshold.

In a method and a system of the related art, the electronic device is not spoof proof in identifying the users. The electronic device identifies the user even when an image, a video or a sculpture of the user is presented before the electronic device for identification. Thereby rendering the electronic device vulnerable for spoof attacks.

Unlike the method and the system in the related art, in the proposed method the electronic device identifies the users based on a comparison between facial descriptor coordinates generated by the electronic device in real-time with that stored at the time of registration. The facial descriptor coordinates are doted form of facial descriptors like eyes, nose, eyebrows, etc. The comparison involves the electronic device providing dynamic weights to the facial descriptors based on a position and motion of the facial descriptors. Since the electronic device identifies the user based on the coordinates of facial descriptors, in the proposed method the electronic device can easily identify mimicking or spoofing.

Unlike the method and the system in the related art, in the proposed method the electronic device considers facial behavioral traits for identifying the user and thereby avoiding scenarios of unintended unlocking of the electronic device.

Unlike the method and the system in the related art, in the proposed method the electronic device can be unlocked faster using natural facial unlock which cannot be mimicked due to the consideration of the facial descriptors for the generation of facial description coordinates, which indicates a behavioral trait of the user. Further, the proposed method is valid for varying skin tone, different lightning conditions and aging. Referring now to the drawings and more particularly to FIGS. 1A through 13B, where similar reference characters denote corresponding features consistently throughout the figure, these are shown preferred embodiments.

FIG. 1A is a block diagram of the electronic device 100 for identifying user, according to one or more embodiments. In FIG. 1, the electronic device 100 may be but not limited to a laptop, a palmtop, a desktop, a mobile phone, a smart phone, Personal Digital Assistant (PDA), a tablet, a wearable device, an Internet of Things (IoT) device, a virtual reality device, a foldable device, a flexible device and an immersive system.

In an embodiment, the electronic device 100 includes an imaging sensor 110, a memory 120, a processor 130, an identity management controller 140 and a display 150. In an embodiment, the imaging sensor 110 may, for example, have millions of pixels (e.g., megapixels) and is configured to capture image frame(s) of a portion of the user's face (explained in FIGS. 4A-4B). The image frame(s) can also belong to a video.

The portion of the user's face may not necessarily mean the front portion of the portion of the user's face. The image frame(s) may be captured of a side (left or right) facial profile of the user. The image frame of the portion of the user's face is captured with environment around the portion of the user's face and is differentiated based brightness and color composition. The brightness and color composition may be for example determined using hue, saturation, value (HSV) color code.

The memory 120 includes a facial descriptor coordinates database 120a which is configured to store multiple first facial descriptor coordinates of the user. The facial descriptor coordinates database 120a also stores multiple second facial descriptor coordinates of the user which are generated at a time of registering the user. The memory 120 stores instructions to be executed by the processor 130. The memory 120 can include non-volatile storage elements. Examples of such non-volatile storage elements may include magnetic hard discs, optical discs, floppy discs, flash memories, or forms of Electrically Programmable Memories (EPROM) or Electrically Erasable and Programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In certain examples, a non-transitory storage medium may store data that can, over time, change (e.g., in Random Access Memory (RAM) or cache).

The processor 130 may include one or a plurality of processors. The one or the plurality of processors may be a general-purpose processor, such as a Central Processing Unit (CPU), an Application Processor (AP), or the like, a graphics-only processing unit such as a Graphics Processing Unit (GPU), a Visual Processing Unit (VPU), and/or an AI-dedicated processor such as a Neural Processing Unit (NPU). The processor 130 may include multiple cores and is configured to execute the instructions stored in the memory 120.

In an embodiment, the identity management controller 140 includes a facial description extractor 142, a description coordinates controller 144, a facial descriptor Convolutional Neural Network (CNN) 146 and an identification controller 148. The identity management controller 140 is implemented by processing circuitry such as logic gates, integrated circuits, microprocessors, microcontrollers, memory circuits, passive electronic components, active electronic components, hardwired circuits, optical components, or the like, and may optionally be driven by firmware. The circuits may, for example, be embodied in one or more semiconductor chips, or on substrate supports such as printed circuit boards and the like.

The facial description extractor 142 is configured to receive the image frame(s) of the user and identify facial descriptors from the image frame(s). Further, the facial description extractor 142 is configured to extract the identified facial descriptors from the image frames. The facial descriptors are extracted pixel by pixel and a face matrix is generated which comprises the extracted data associated with each of the facial descriptors. The facial descriptors include but not limited to eyes, nose, mouth, ear, forehead, eyebrows, eyeballs, chin, lips, forehead size, face lob, hair and cheeks. The facial description extractor 142 initially enhances a quality or lighting condition associated with the image frame of the portion of the user's face. The quality of the image frame is enhanced by for example but not limited to, applying color filtration, Exposure Compensation and white balance techniques. The lighting condition is enhanced by for example but not limited to, applying null set image masking and downsampling or upsampling the image based upon the lightning conditions.

To determine the type of image enhancement technique to be used, the brightness of the image is determined using exposure time and the HSV colors and based on these values the color filtration methods such as smoothening the image or sharpening the image, white balancing is applied. After that identify that if the lightning condition is very bad then upsample (Improve image quality) the image and if lighting condition is very good, downsampling (Downgrade image quality) the image. According to an embodiment, the facial description extractor 142 may be configured to determine a position and dimension of each of the plurality of facial descriptors from the at least one enhanced image of the portion of the user's face.

The description coordinates controller 144 is configured to generate first facial descriptor coordinates by combining the descriptors extracted from the image frames of the user captured in real-time and second facial descriptor coordinates using the descriptors extracted from the image frames of the user captured during registration of the user. The first facial descriptor coordinates and the second facial descriptor coordinates may be for example but not limited to a dot model representation of the facial descriptors. The description coordinates controller 144 may use a face outline as a reference into which the facial descriptors extracted from the image frames are ingrained to obtain the first facial descriptor coordinates and the second facial descriptor coordinates.

Further, the first facial descriptor coordinates and the second facial descriptor coordinates are surrounded by respective facial boundary box. In an example, consider that the electronic device 100 captures one-hundred (100) image frames of the portion of the user's face during registration. Then, the description coordinates controller 144 may generate 100 second facial descriptor coordinates corresponding to each of the 100 image frames captured which is then stored in the facial descriptor coordinates database 120a of the memory 120.

The facial descriptor CNN 146 is configured to determine a first distance between the first facial descriptor coordinates and the second facial descriptor coordinates. The first distance between the first facial descriptor coordinates and the second facial descriptor coordinates is determined based on a position of the user while capturing the image frames. The first distance is related to a shift of the second facial descriptor coordinates of the registered face with the first facial descriptor coordinates of a new face along Z-Axis. The first distance is positive if the first facial descriptor coordinates is way different from the second facial descriptor coordinates and the first distance is negative if the first facial descriptor coordinates is close to the second facial descriptor coordinates.

The facial descriptor CNN 146 is configured to resize the first facial descriptor coordinates radially and angularly based on the first distance between the first facial descriptor coordinates and the second facial descriptor coordinates, and a weight associated with each of the facial descriptors used to generate the first facial descriptor coordinates. The procedure of weight determination and assignment of the weight is described in detail in FIGS. 7A-7C.

The weight associated with each of the facial descriptors indicates a position and motion of the facial descriptor with respect to each of the other plurality of facial descriptors. For example, the nose is provided low weightage as compared to the eyebrows as the eyebrows have greater motion than the nose. Further, the facial descriptor CNN 146 is configured to reshape the first facial descriptor coordinates radially over the second facial descriptor coordinates based on the first distance and the weight associated with each of the facial descriptors.

The reshaping may be for example expanding and shrinking a size of the first facial descriptor coordinates with respect to the second facial descriptor coordinates. The reshaping will also ensure that each of the dots representing the facial descriptors is also reshaped.

Further, the facial descriptor CNN 146 is configured to determine an angle of rotation of the reshaped first facial descriptor coordinates in comparison to the second facial descriptor coordinates and resize the reshaped first facial descriptor coordinates by rotating the reshaped first facial descriptor coordinates until the facial boundary box of the reshaped first facial descriptor coordinates matches the facial boundary box of the second facial descriptor coordinates. The rotation of the reshaped first facial descriptor coordinates is performed along X axis, Y axis and Z axis at zero degree. The facial descriptor CNN 146 is then configured to determine a second distance between the resized first facial descriptor coordinates and the second facial descriptor coordinates. The second distance is for example a L2 distance in a vector space, Manhattan Distance, Minkowski Distance, Hamming Distance. A L2 norm determines the L2 distance of a vector coordinate from origin of the vector space. The L2 may also be calculated as Euclidean distance from origin of the vector space.

The identification controller 148 is configured to determine that the second distance between the resized first facial descriptor coordinates and the second facial descriptor coordinates meets a second distance threshold. The second distance threshold is for example a L2 distance threshold. The identification controller 148 is configured to identify the user of the electronic device 100 based on the second distance between the resized first facial descriptor coordinates and the second facial descriptor coordinates meeting the second distance threshold.

For example, the identification controller 148 may be configured to identify the user of the electronic device 100 based on the second distance between the resized first facial descriptor coordinates and the second facial descriptor coordinates being less than the second distance threshold. Further, the identification controller 148 is configured to identify the user's face is not a facial mimic, on determining that the second distance does not meet the second distance threshold and the user's face is the facial mimic, on determining that the second distance meets the second distance threshold.

In another example, the identification controller 148 is configured to determine a probability of an attentiveness feature of the user's face based on the second distance meeting the second distance threshold. The attentiveness feature is happy and neutral. Further, the identification controller 148 is configured to determine a probability of inattentiveness feature based on the second distance meeting the second distance threshold. The inattentiveness feature is sad, angry, surprise and sleepy.

Further, the identification controller 148 is configured to determine whether the probability of the attentiveness feature is greater than the probability of the inattentiveness feature and determine that the user's face is attentive, on determining that the probability of the attentiveness feature is greater than the probability of the inattentiveness feature, and the user is not attentive, on determining that the probability of the attentiveness feature is not greater than the probability of the inattentiveness feature.

Therefore, in the proposed method, the electronic device 100 takes into consideration a facial consent of the user, a behavioral intent and liveliness for identifying the user. At least one of the plurality of modules/components of the identity management controller 140 may be implemented through an Artificial Intelligence (AI) model.

A function associated with AI may be performed through memory 120 and the processor 130. The one or a plurality of processors controls the processing of the image frames and the facial descriptors in accordance with a predefined operating rule or AI model stored in the non-volatile memory and the volatile memory. The predefined operating rule or artificial intelligence model is provided through training or learning. Being provided through learning means that, by applying a learning process to a plurality of learning image frames comprising various facial descriptors along with color variations, a predefined operating rule or AI model of a desired characteristic is made. The learning may be performed in a device itself in which AI according to an embodiment is performed, and/o may be implemented through a separate system.

The AI model may include a plurality of neural network layers such as the facial descriptor CNN 146. Each layer has a plurality of weight values and performs a layer operation through calculation of a previous layer and an operation of a plurality of weights. Examples of neural networks include, but are not limited to, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Generative Adversarial Networks (GAN), and deep Q-networks.

The learning process is a method for training a predetermined target device (for example, a robot) using a plurality of learning data to cause, allow, or control the target device to make a determination or prediction. Examples of learning processes include, but are not limited to, supervised learning, unsupervised learning, semi-supervised learning, or reinforcement learning.

In an embodiment, the display 150 is configured to display image frames captured by the imaging sensor 110 and also to display a message indicating the identification of the user.

Although FIG. 1A shows the hardware elements of the electronic device 100 but it is to be understood that other embodiments are not limited thereon. In other embodiments, the electronic device 100 may include less or more number of elements. Further, the labels or names of the elements are used only for illustrative purpose and does not limit the scope of the disclosure. One or more components can be combined together to perform same or substantially similar function.

Figure 1B:
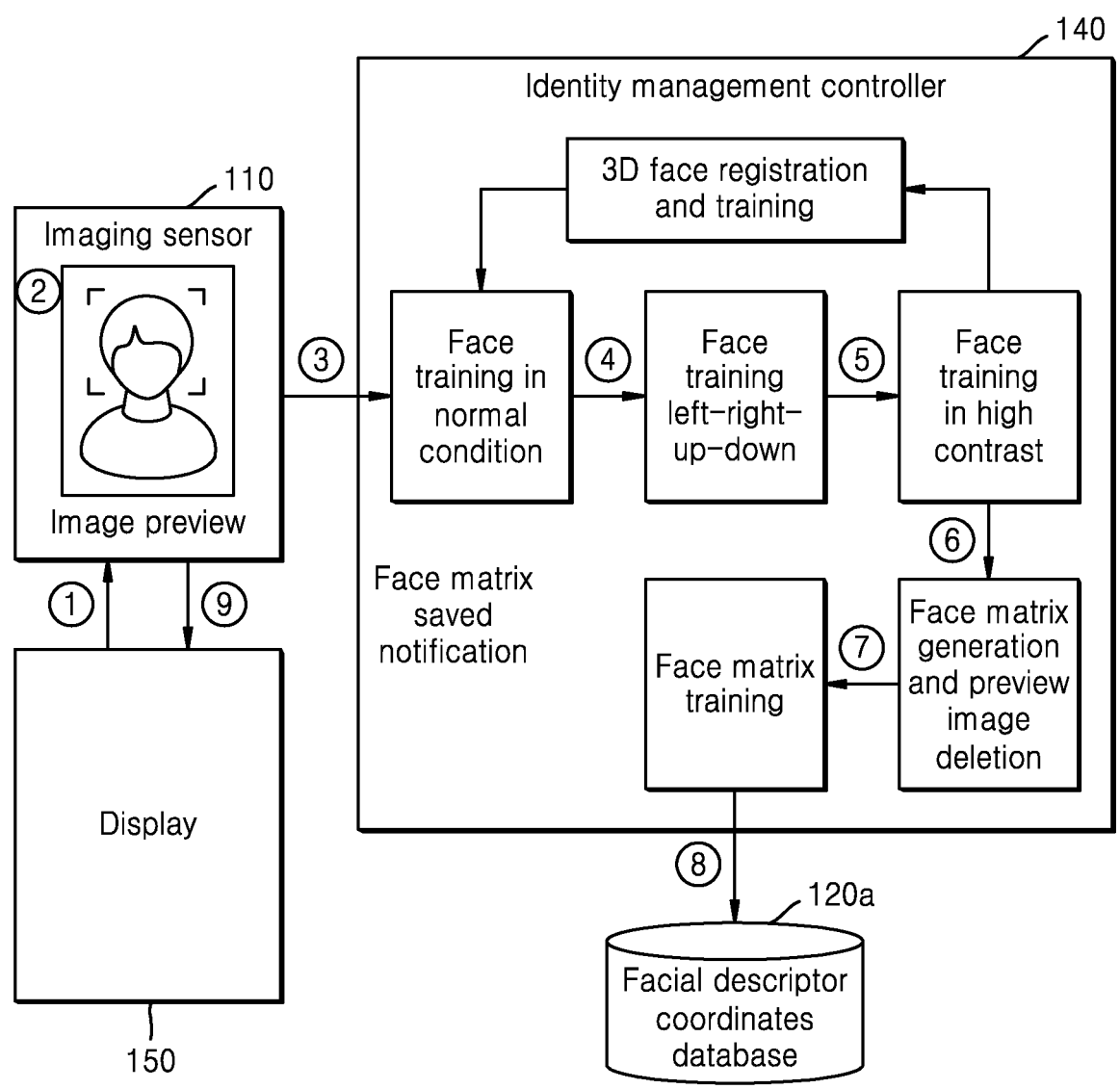
FIG. 1B is an example illustrating a flow associated with facial registration of the user of the electronic device, according to one or more embodiments.

FIG. 1B is an example illustrating a flow associated with facial registration of the user of the electronic device 100, according to one or more embodiments. In FIG. 1B, at operation 1, display 150 is configured to allow the user to activate the imaging sensor 110. At operation 2, the imaging sensor 110 provides a preview of the image frames to the user. Further at operation 3, the identity management controller 140 performs face training in normal condition, at operation 4 face training by capturing image frames of the user's face in left-right-up-down directions and at operation 5 face training in high contrast. The 3-D face is registered and the identity management controller 140 is trained using grayscale images for N*N*P face matrix. At operation 6, a Face matrix is generated and the preview image frames deleted and at operation 7 face matrix training is performed. At operation 8, the face matrix is also stored in the facial descriptor coordinates database 120a. Finally, at operation 9, a face matrix saved notification is provided on the display 150.

Figure 1C:
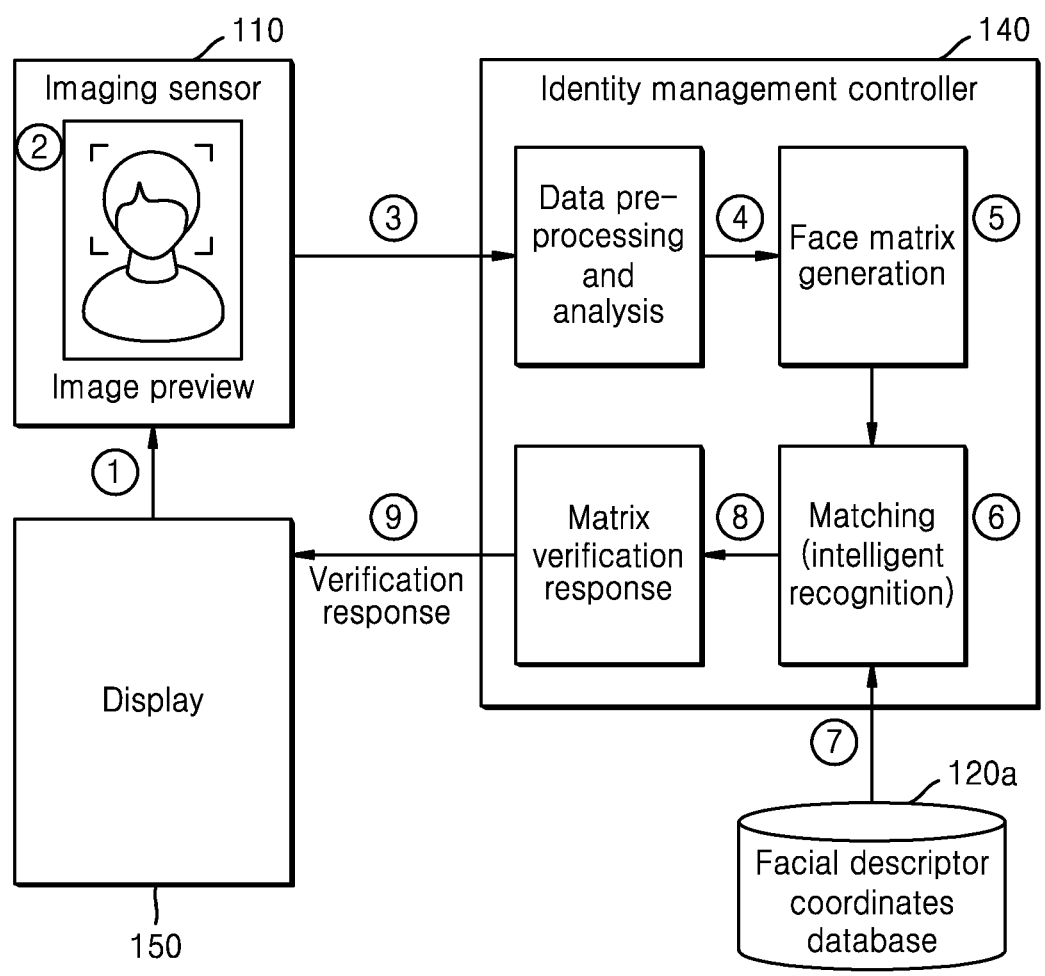
FIG. 1C is an example illustrating a flow associated with facial recognition of the user of the electronic device, according to one or more embodiments.

FIG. 1C is an example illustrating a flow associated with facial recognition of the user of the electronic device 100, according to one or more embodiments. In FIG. 1C, at operation 1, the electronic device 100 displays a lock screen User Interface (UI) to display a face recognition icon indicating to the user that the image frames of the portion of the user's face is captured.

At operation 2, the imaging sensor 110 provides a preview of the image frames to the user. Further at operation 3, the identity management controller 140 receives the captured image frames of the user. The imaging sensor 110 captures the face preview every time the user clicks on the lockscreen button and starts capturing facial components and detects the face if exists and share the detected face with the identity management controller 140 to identify that the current user is owner or not.

At operation 4, the identity management controller 140 performs the pre-processing of data (Color correction, Glare removal, brightness adjustment and contrast control) and at operation 5 generates the facial matrix of the user's face. At operation 6, the data is shared for intelligent recognition where the identity management controller 140 communicates with the facial descriptor coordinates database 120a (operation 7) and verifies the data using the facial descriptor CNN 146 and Chi-Square Distance metrics.

Further, at operation 8 the matrix verification response is determined by the identity management controller 140. The matrix verification response verifies and confirms that the face captured by the electronic device 100 is the same as that of the user registered with the electronic device 100. Further, the response of the verification is shared with the display 150 at operation 9.

FIG. 2 is a flow chart 200 illustrating the method for identifying the user of the electronic device 100, according to one or more embodiments. In FIG. 2, at operation 202, the electronic device 100 captures the image frame(s) of portion of the user's face. For example, in the electronic device 100 as illustrated In FIG. 1A, the imaging sensor 110 is configured to capture the image frame(s) of portion of the user's face.

At operation 204, the electronic device 100 extracts the facial descriptors from the image frame(s) of the portion of the user's face. For example, in the electronic device 100 as illustrated In FIG. 1A, the identity management controller 140 is configured to extract the facial descriptors from the image frame(s) of the portion of the user's face.

At operation 206, the electronic device 100 generates the first facial descriptor coordinates using the facial descriptors. For example, in the electronic device 100 as illustrated In FIG. 1A, the identity management controller 140 is configured to generate the first facial descriptor coordinates using the facial descriptors.

At operation 208, the electronic device 100 determines the first distance between the first facial descriptor coordinates and second facial descriptor coordinates. For example, in the electronic device 100 as illustrated In FIG. 1A, the identity management controller 140 is configured to determine the first distance between the first facial descriptor coordinates and second facial descriptor coordinates.

At operation 210, the electronic device 100 resizes the first facial descriptor coordinates radially and angularly based on the first distance and weight associated with each of the facial descriptors used to generate the first facial descriptor coordinates. For example, in the electronic device 100 as illustrated In FIG. 1A, the identity management controller 140 is configured to resize the first facial descriptor coordinates radially and angularly based on the first distance and weight associated with each of the facial descriptors used to generate the first facial descriptor coordinates. According to an embodiment, the electronic device 100 transform the first facial descriptor coordinates using at least one of rotation matrix or scale matrix based on the first distance and a weight associated with each of the plurality of facial descriptors used to generate the at least one first facial descriptor coordinates.

At operation 212, the electronic device 100 determines the second distance between the resized first facial descriptor coordinates and the second facial descriptor coordinates. For example, in the electronic device 100 as illustrated In FIG. 1A, the identity management controller 140 is configured to determine the second distance between the resized first facial descriptor coordinates and the second facial descriptor coordinates.

At operation 214, the electronic device 100 identifies whether the second distance between is less than the second distance threshold. For example, in the electronic device 100 as illustrated In FIG. 1A, the identity management controller 140 is configured to determine that the second distance between meets the second distance threshold.

At operation 216, the electronic device 100 identifies the user of the electronic device 100 based on the second distance meeting the second distance threshold. For example, in the electronic device 100 as illustrated In FIG. 1A, the identity management controller 140 is configured to identify the user of the electronic device 100 based on the second distance being less than the second distance threshold. According to an embodiment, the electronic device 100 identify whether the user's face is attentive. According to an embodiment, the electronic device 100 identify whether the user's face is not a facial mimic. According to an embodiment, the electronic device 100 identifies the user of the electronic device 100 based on at least one of the user's face being attentive or the user's face being not a facial mimic.

The various actions, acts, blocks, operations, or the like in the method may be performed in the order presented, in a different order or simultaneously. Further, in some embodiments, some of the actions, acts, blocks, operations, or the like may be omitted, added, modified, skipped, or the like without departing from the scope of the disclosure.

Figure 3:
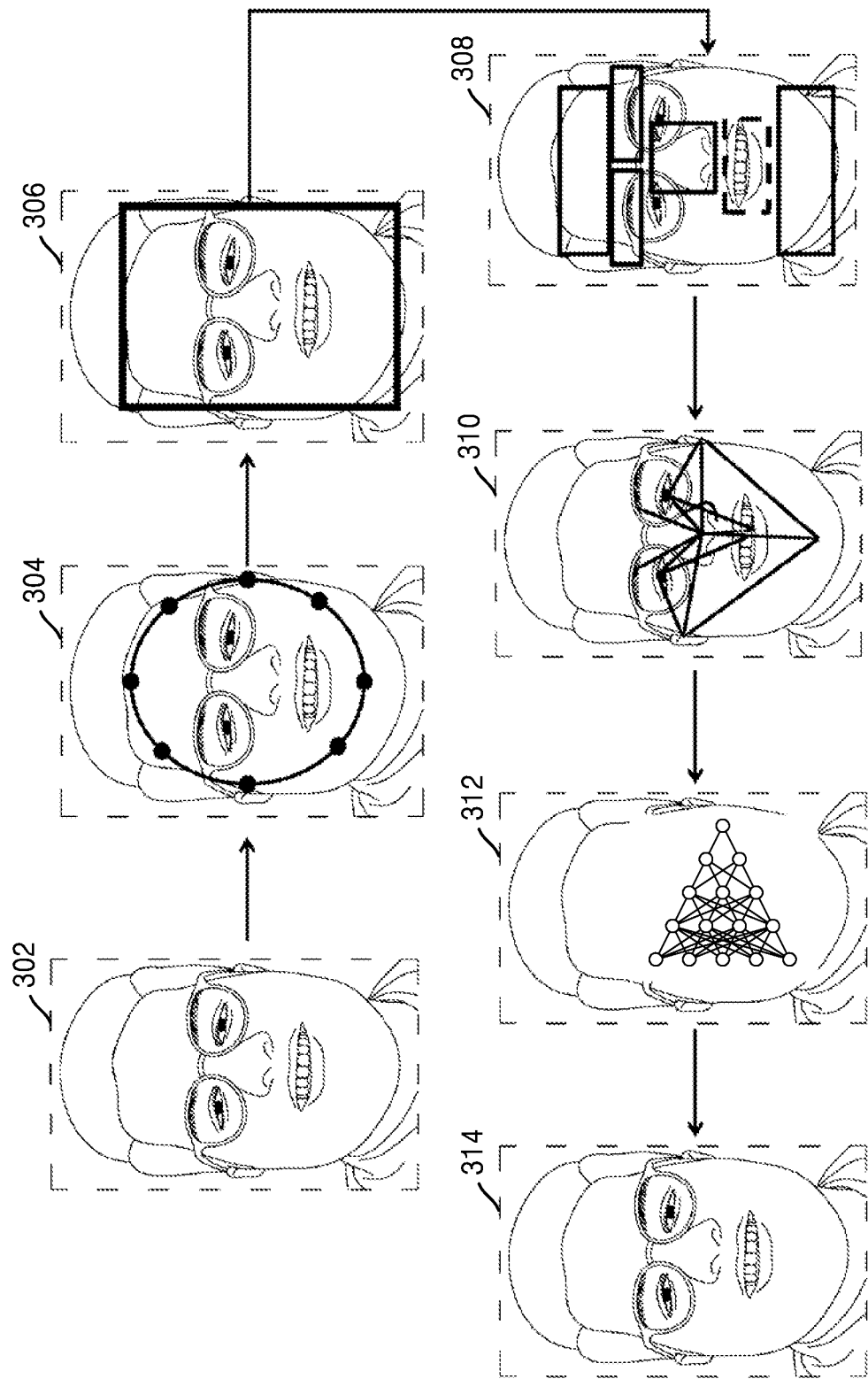
FIG. 3 illustrates a sequence of operations performed for identifying the user of the electronic device, according to one or more embodiments.

FIG. 3 illustrates a sequence of operations performed for identifying the user of the electronic device 100, according to one or more embodiments. In FIG. 3, at operation 302 the electronic device 100 captures the image frames of the user in real-time and at operation 304 determines the portion of the user's face. Further, at operation 306, the electronic device 100 using pixel compensation method determines the facial attentiveness. At operation 308, the electronic device 100 determines the facial descriptors such as the eyes, nose, lips, etc., using the weighted facial descriptor CNN 146 to determine the mimicking. Further, at operation 310, the electronic device 100 determines the facial coordinates and at operation 312 applies the facial descriptor CNN 146 to identify the user as either mimic or not (as shown in operation 314.)

Figure 4A:
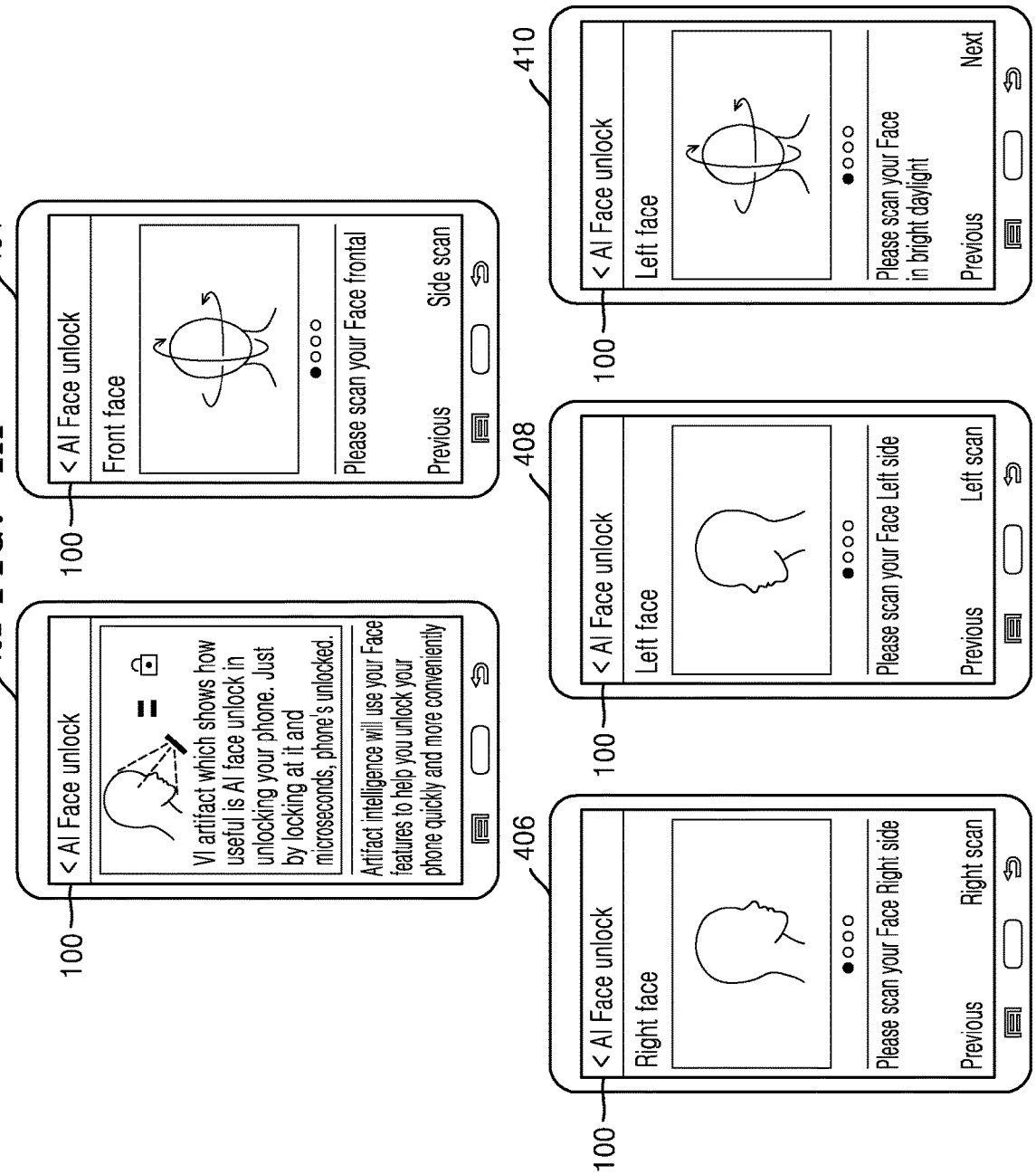
FIG. 4A is an example illustrating registration of the user of the electronic device for an unlocking application, according to one or more embodiments.

FIG. 4A is an example illustrating registration of the user of the electronic device 100 for an unlocking application, according to one or more embodiments. In FIG. 4A, UI displayed on the electronic device 100 while registering the user of the electronic device 100 for the unlocking application is provided. At operation 402, the electronic device 100 provides the UI displaying the information regarding the unlocking application. At operation 404, the electronic device 100 provides the UI for capturing the frontal face image frame(s) of the user which also provides information regarding the angle in which the user has to face the imaging sensor 110 of the electronic device 100. The electronic device 100 may obtain an input for moving to an operation of acquiring a side face image frame from a user after the front face image frame is captured. For example, once the frontal face image frame(s) of the user is captured, the user selects "side scan" option provided at the bottom left corner of the UI.

At operation 406, the electronic device 100 provides the UI for capturing image frame(s) of right portion of the portion of the user's face. The electronic device 100 may obtain a user input for capturing the right portion of the face. For example, the user selects "right scan" option to capture the right portion of the face.

At operation 408, the electronic device 100 provides the UI for capturing image frame(s) of left portion of the user's face. The electronic device 100 may obtain a user input for capturing the left portion of the face. For example, the user selects "left scan" option to capture the left portion of the face. At operation 410, the electronic device 100 also provides information regarding the lighting condition in which the user needs to capture the image frame(s) of the portion of the user's face such as "bright day light". All the image frames captured are stored in the memory 120 along with the respective second facial descriptor coordinates which will be used to identify the user in real-time.

Figure 4B:
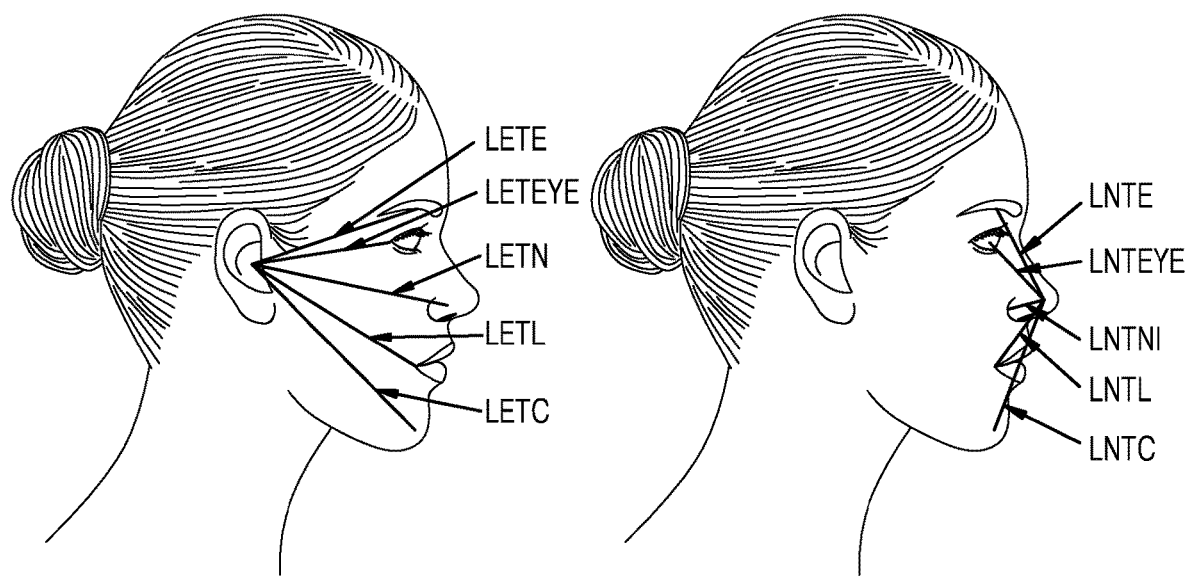
FIG. 4B illustrates facial angled co-ordinates determined based on image frames captured by the electronic device, according to one or more embodiments.

FIG. 4B illustrates facial angled co-ordinates determined based on the image frames captured by the electronic device 100, according to one or more embodiments. In FIG. 4B, in conjunction with FIG. 4A in the proposed method the facial image frame(s) is captured omni-directionally. The calculation of co-ordinates provides information such as facial depth, facial distance mesh and facial feature size. The facial depth includes for example depth of the nose, depth of the eyes, depth of the face etc. The facial distance mesh is a 3-D model to identify the first distance and the second distance and to ensure that the depth is calculated based on the first distance and the second distance. The facial feature size is used for future learning of the user and to check that user's facial identity remains intact.

Further, the electronic device 100 also determines certain distances between the image frame(s) of right portion of the user's face and the image frame(s) of left portion of the user's face. In FIG. 4B the co-ordinate points are provided with respect to the left portion of the user's face which include Left Ear to Eyebrow (LETE), Left Ear to Eye (LETEYE), Left Ear To Nose (LETN), Left Ear to Lips (LETL), Left Ear to Chin (LETC), Left Nose to Eyebrow (LNTE), Left Nose to Eye (LNTEYE), Left to Nose Internal Depth (LNTNI), Left Nose to Lips (LNTL) and Left Nose to Chin (LNTC). Similarly, the co-ordinate points are provided with respect to the right portion of the user's face.

For example, distance between Left Ear To Nose is be Calculated as:

$$D_{LETN} = \sqrt{(E_1 - N_1)^2 + (E_2 - N_2)^2}$$

where $(N_1, N_2)$, $(E_1, E_2)$ are co-ordinate points of nose and left ear, respectively.

Figure 5:
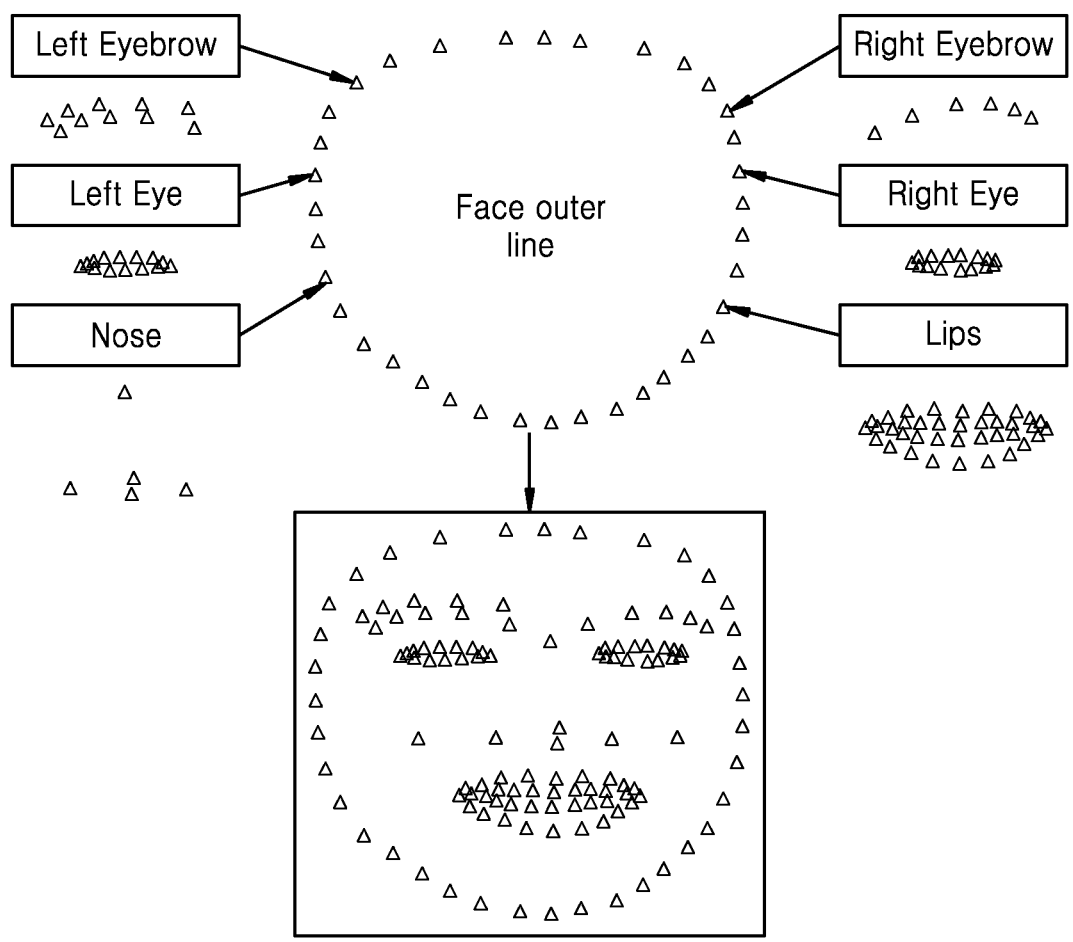
FIG. 5 illustrates extraction of facial descriptors from the image frame(s) of the portion of the user's face and generation of first facial descriptor coordinates by the electronic device, according to one or more embodiments.

FIG. 5 illustrates extraction of the facial descriptors from the image frame(s) of the portion of the user's face and generation of the first facial descriptor coordinates by the electronic device 100, according to one or more embodiments. In FIG. 5, the electronic device 100 after capturing the image frame(s) of the portion of the user's face, extracts the facial descriptors such as the eyes, the nose, the lips, the cheeks, the forehead, etc. from the image frame(s). Further, the electronic device 100 selects one frame and generates the first facial descriptor coordinates such as for example a dot model for the face by combining all the facial descriptors (e.g. left eyebrow shown in dotted line box, lips shown in Green box herein). Further, the electronic device 100 also creates the facial outer boundary box around the first facial descriptor coordinates.

Figure 6A:
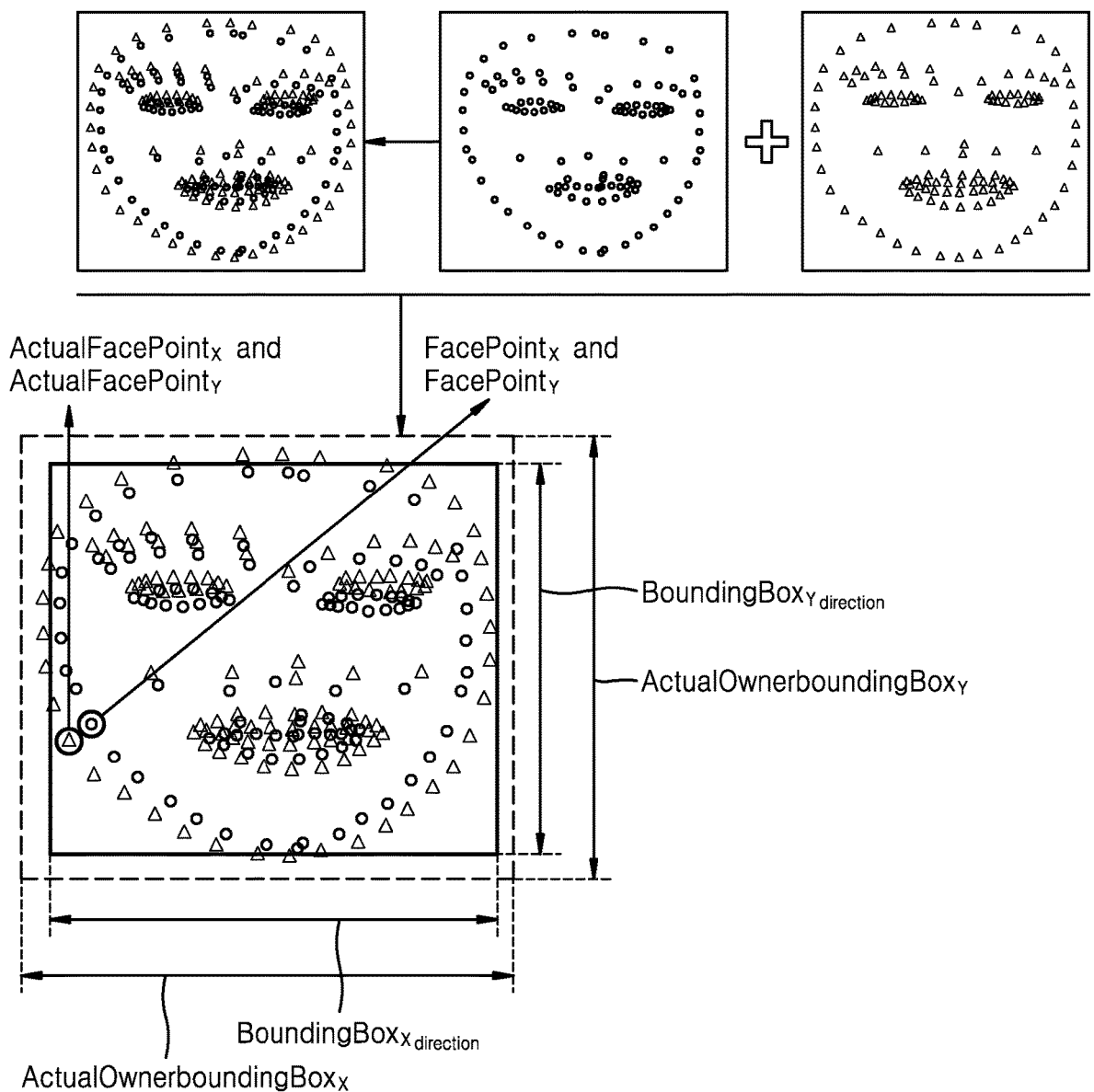
FIG. 6A illustrates the determination of a first distance between the first facial descriptor coordinates and second facial descriptor coordinates by the electronic device, according to one or more embodiments.

FIG. 6A illustrates the determination of the first distance between the first facial descriptor coordinates and the second facial descriptor coordinates by the electronic device 100, according to one or more embodiments. In FIG. 6A, the electronic device 100 after generating the first facial descriptor coordinates for the image frames of the user captured in real-time, determines the first distance between the first facial descriptor coordinates and the second facial descriptor coordinates. The first distance is the shift of the first facial descriptor coordinates with respect to the second facial descriptor coordinates, stored at the time of registering the user.

The electronic device 100 determines the shift with respect to each of the facial descriptors. From FIG. 6A, since the first facial descriptor coordinates comprising the circle dots is smaller than the second facial descriptor coordinates comprising the triangle dots i.e., the facial bounding box (solid line box) of the first facial descriptor coordinates is smaller than the facial bounding box (dotted line box) of the second facial descriptor coordinates, the electronic device 100 determines that the user is away from the imaging sensor 110. In another example, the electronic device 100 determines that the facial bounding box (solid line box) of the first facial descriptor coordinates is larger than the facial bounding box (dotted line box) of the second facial descriptor coordinates, the electronic device 100 determines that the user is close to the imaging sensor 110. Therefore, the electronic device 100 determines the first distance between the first facial descriptor coordinates and the second facial descriptor coordinates along Z-Axis based on the position of the user in real-time.

The electronic device 100 determines the first distance between the first facial descriptor coordinates and the second facial descriptor coordinates along Z-Axis (For face oval Points) using the equations:

$$X_{position} = BoundingBox_{X_{direction}} - ActualOwnerboundingBox_X \quad (1)$$

$$Y_{position} = BoundingBox_{Y_{direction}} - ActualOwnerboundingBox_Y \quad (2)$$

$$FacePoint'_X = X_{Position} * \left| \frac{FacePoint_X}{ActualownerBoundingBox_X} \right| \quad (3)$$

$$FacePoint'_Y = Y_{Position} * \left| \frac{FacePoint_Y}{ActualownerBoundingBox_Y} \right| \quad (4)$$

$$\text{First distance} = \sqrt{(FacePoint'_x - ActualFacePoint_X)^2 - (FacePoint'^2_Y - ActualFacePoint_Y)^2} \quad (5)$$

Therefore, the first distance is determined based on the position of the user with respect to the imaging sensor 110. When the position of the user is away from the imaging sensor 110 of the electronic device 100, then the first distance is a positive value. Therefore, the first distance is positive if the first facial descriptor coordinates are away from the second facial descriptor coordinates of the actual registered face beyond a first distance threshold, else the first distance is negative. Therefore, when the electronic device 100 determines that the first distance is either positive or negative, then the electronic device 100 can for example provide indications to the user to move either away from or toward the electronic device 100 to be able to capture the image frame which provides the closest first distance.

Figure 6B:
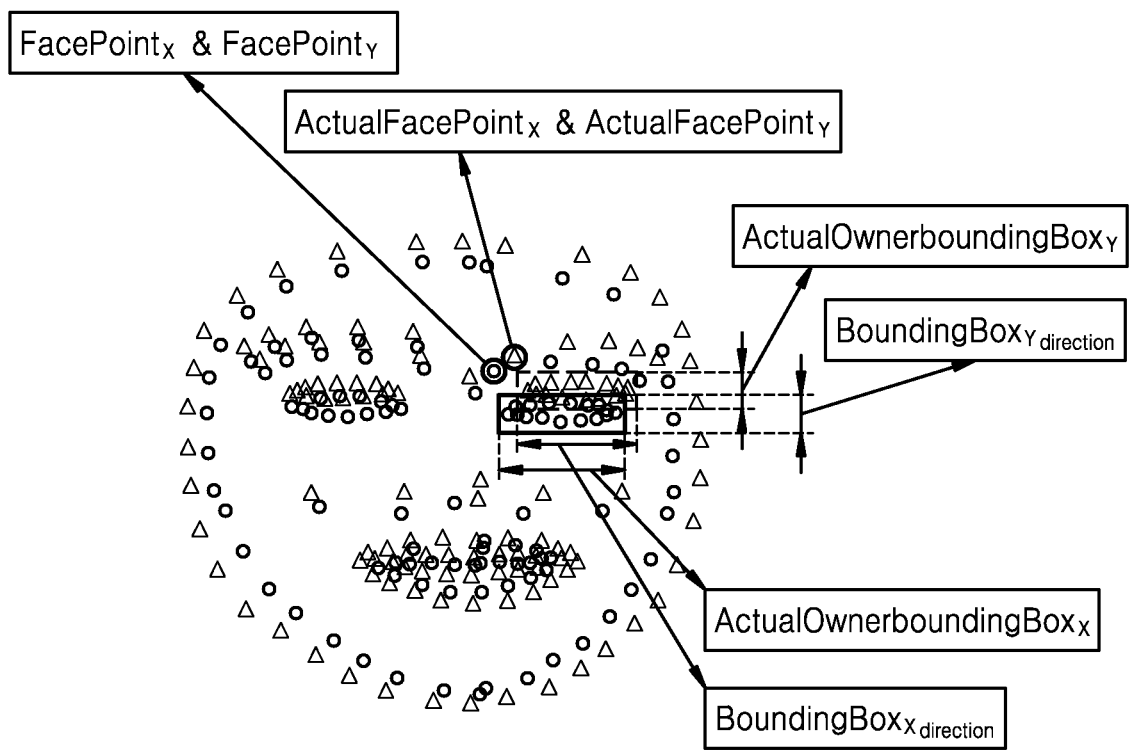
FIG. 6B is an example illustrating the determination of the first distance with respect to eyes in the first facial descriptor coordinates and the second facial descriptor coordinates by the electronic device, according to one or more embodiments.

FIG. 6B is an example illustrating the determination of the first distance with respect to the eyes in the first facial descriptor coordinates and the second facial descriptor coordinates by the electronic device 100, according to one or more embodiments. In FIG. 6B, in conjunction with FIG. 6A, the proposed method for determining the first distance between the first facial descriptor coordinates and the second facial descriptor coordinates along Z-Axis includes the determination of the first distance for each of the facial descriptors such as for example the eye, node, eyebrows, etc. FIG. 6B illustrates the determination of the first distance between the first facial descriptor coordinates and the second facial descriptor coordinates for the eye.

Figure 6C:
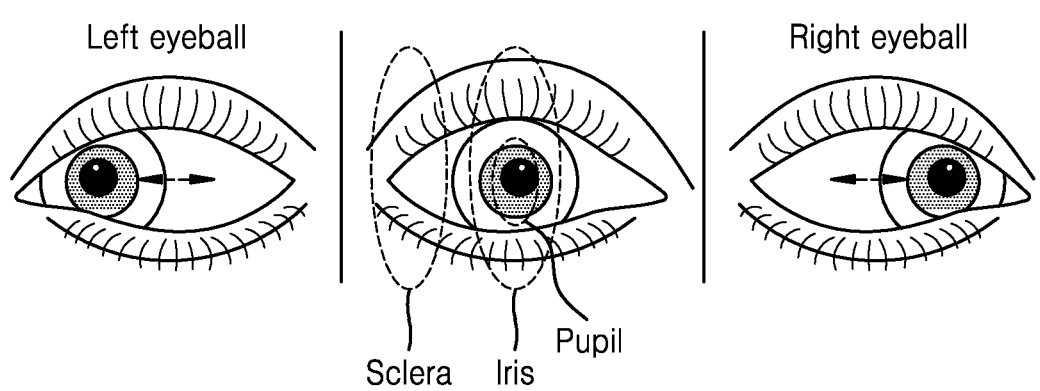
FIG. 6C illustrates use of eyeball motion in determination of the first distance with respect to the eyes in the first facial descriptor coordinates and the second facial descriptor coordinates by the electronic device, according to one or more embodiments.

FIG. 6C illustrates the use of eyeball motion in the determination of the first distance with respect to the eyes in the first facial descriptor coordinates and the second facial descriptor coordinates by the electronic device 100, according to one or more embodiments. In FIG. 6C, in conjunction with FIG. 6B, the first distance between the first facial descriptor coordinates and the second facial descriptor coordinates for the eyeball is determined after conversion of the eyeball motion into the dot model, as the eyeball has greater gradual motion compared to other facial descriptors.

In another embodiment, the motion of the eyeball is detected based on the weight assigned to the eyeball. The method includes converting the image of the eye into grayscale and a thresholding technique is used to identify a position of pupil and a position of iris and a shift in the position of the pupil and a shift in the position of the iris from the actual position to identify the motion of the eye ball.

Resolution:(Pixel $i$-Pixel $j$)≥Threshold, where Threshold[0.255]

Threshold may be associated with a type of image segmentation, where we change the pixels of an image to make the image easier to analyze. In threshold, we convert an image from color or grayscale into a binary image.

In an example, the motion of the eyeball may be considered for determining the attentiveness of the user of the electronic device 100. Further, since the iris is unique to each user, the shift in the position of the iris from the actual position and a pattern of motion of the iris can be learned for each user which helps in identifying the user.

Figure 7A:
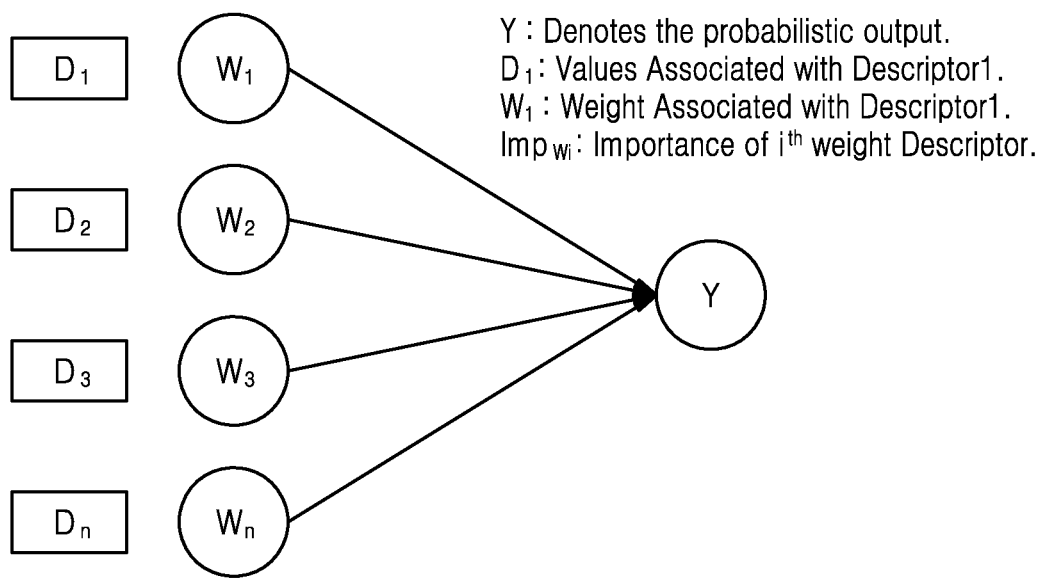
FIG. 7A illustrates determining weight associated with the facial descriptors by the electronic device, according to one or more embodiments.

FIG. 7A illustrates determining the weight associated with the facial descriptors by the electronic device 100, according to one or more embodiments. In FIG. 7A, in the proposed method the first facial descriptor coordinates are reshaped radially based on the first distance and the weight associated with each of the facial descriptors.

Each of the facial descriptors is represented using dots in the first facial descriptor coordinates. The dots are assigned predefine weights. D_n (D1, D2, D3, . . . , Dn)=Values associated with facial-descriptors. For example, D1=Nose, D2=eye, etc.

In FIG. 7A, Y denotes an intermediate function:

$$Y = f(W_1D_1) + f(W_2D_2) + \ldots + f(W_nD_n) \tag{6}$$

$$Y = f(0.08*Eye_i) + f(0.30*Eyebrow_i) + f(0.08*Nose_i) + f(0.30*Lips_i) + f(0.08*Chin_i) \tag{7}$$

$$Y = 0.08*f(Eye_i) + 0.30*f(Eyebrow_i) + 0.08*f(Nose_i) + 0.30*f(Lips_i) + 0.08*f(Chin_i) \tag{8}$$

Further, the electronic device 100 also determines loss functions indicating the loss which occurs while using different weights and importance associated with each of the facial descriptors based on the weights and frequency. The electronic device 100 assigns weight dynamically for each of the facial descriptors. The electronic device 100 determines the losses and back propagates those features to actually calculate and identify which feature is important in the weightage facial descriptor based facial descriptor CNN 146.

Once the importance of each of the facial descriptors is initialized the electronic device 100 determines whether the loss of the function is sufficient enough or not using the back propagation function.

According to an embodiment, the loss function is:

$$J = -Y \log(Y') - (1-Y)\log(1-Y') \tag{9}$$

where J is loss function, Y is probabilistic output, Y' is complementary of output. $-0.4 <$ Sufficient Loss $< 0.4$.

If a user is not mimicking with the stochastic probability of 60% then, Y=0.6, Y'=0.4.

$J = -(0.6 \log(0.4) + (1-0.6)\log(1-0.4))$ $J = -(0.6*(-0.397) + (0.4)*(-0.22))$ $J = (0.2382 + 0.088)$ $J = 0.3262$ Therefore, the loss is sufficient based on the weights. If the loss is not sufficient enough then the weights are updated based on the back propagation.

Further, the proposed method of weight assignment can be extended for multi-class mimicking function by calculating stochastic probability distribution as well as importance of the facial descriptors. The importance of the facial descriptors (F) would be N*1 dimensional matrix vector and W would be M*N Dimensional Vector where:

N→Number of Output Units.
M→Number of Classes.

$W_i^T F + c$ would be $M*1$ Dimensional vector of output
$$Y(Y_1, Y_2, Y_3, \ldots, Y_m) \tag{10}$$

The stochastic probability distribution in terms of output $P_i$ will be:

$$P_i = e^{Y_t} / \sum_{(i=0)}^{m} e^{Y_t} \tag{11}$$

Figure 7B:
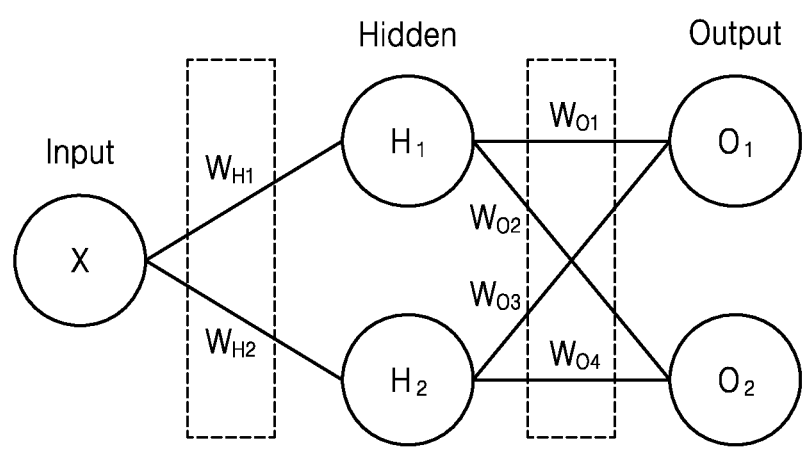
FIG. 7B is an architecture for determining the weight associated with the facial descriptors by the electronic device, according to one or more embodiments.

FIG. 7B is an architecture for determining the weight associated with the facial descriptors by the electronic device 100, according to one or more embodiments. In FIG. 7B, the weightage of each of the facial descriptors indicates the contribution of the facial descriptor or the importance of the facial descriptor. The weights generally define how much the facial descriptor contributes in the facial descriptor CNN 146. In the proposed method, the electronic device 100 defines some facial descriptors as more important than the remaining facial descriptors to determine facial mimicking. The facial descriptor CNN 146 is initialized with parameters, if done correctly then optimization will be achieved in the least time.

Figure 7C:
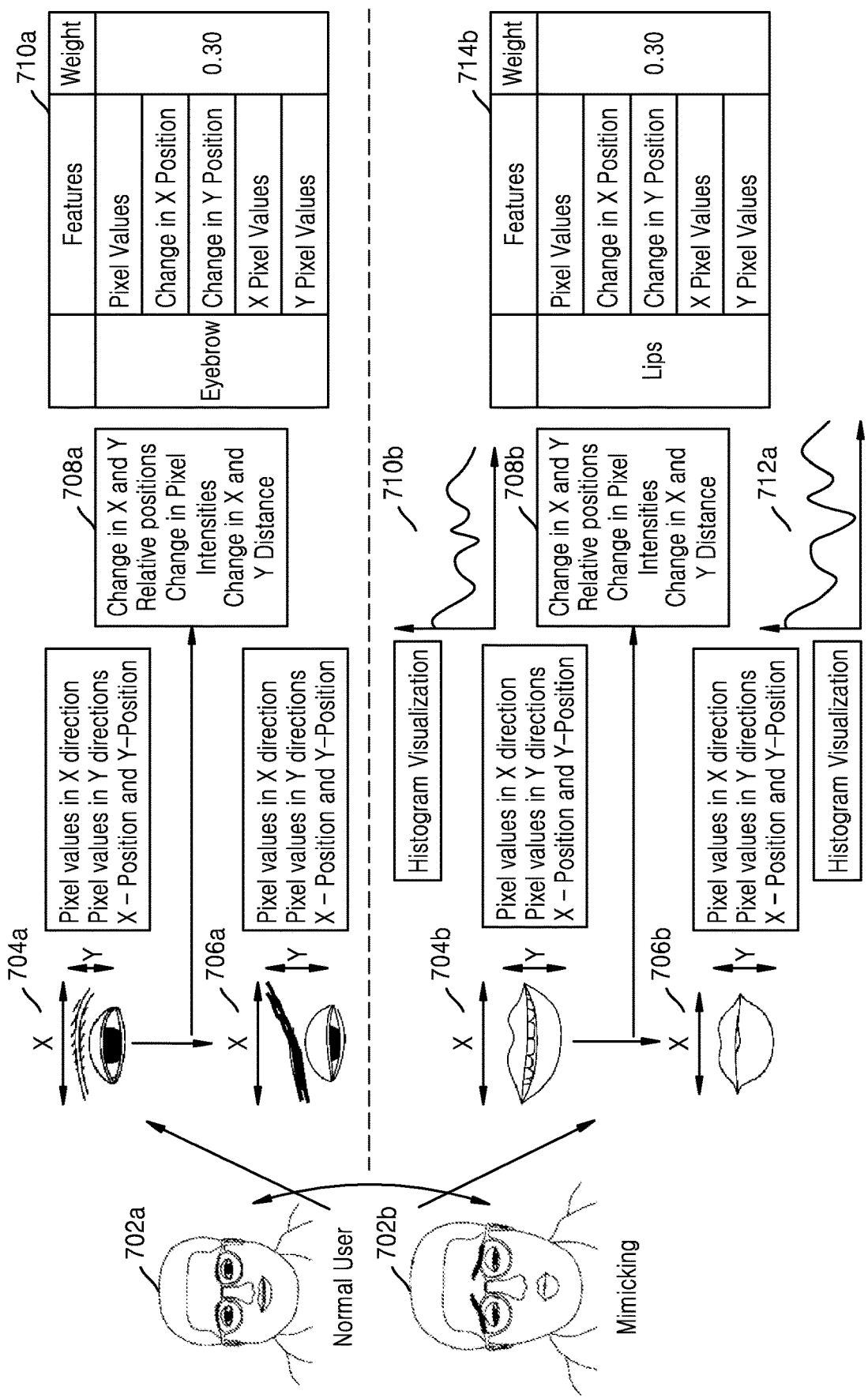
FIG. 7C is an example illustrating determining the weight associated with eyebrow and lips by the electronic device, according to one or more embodiments.

FIG. 7C is an example illustrating determining the weight associated with the eyebrow and lips by the electronic device 100, according to one or more embodiments. In FIG. 7C, consider a scenario where at operation 702a the electronic device 100 stores the image frame of the user in real-time at the time of registration. In real-time consider that the electronic device 100 at operation 702b captures the image frame of the mimic of the user.

At operation 704a, the electronic device 100 determines the pixel values associated with the eyebrow in X direction, pixel values associated with the eyebrow in Y direction, and X-position and Y-position of the eyebrow in the second facial descriptor coordinates stored in the electronic device 100. Similarly, at operation 706a, the electronic device 100 determines the pixel values associated with the eyebrow in X direction, pixel values associated with the eyebrow in Y direction, and X-position and Y-position of the eyebrow in the first facial descriptor coordinates generated based on the image frame captured in real-time at operation 702b. Further, at operation 708a, the electronic device 100 determines a change in the X and Y relative positions, a change in pixel intensities and a change in X and Y distance between the eyebrow in the second facial descriptor coordinates and the eyebrow in the first facial descriptor coordinates. At operation 710a, the electronic device 100 determines the weight for the eyebrow as 0.3.

At operation 704b, the electronic device 100 determines the pixel values associated with the lips in X direction, pixel values associated with the lips in Y direction, and X-position and Y-position of the lips in the second facial descriptor coordinates stored in the electronic device 100. Similarly, at operation 706b, the electronic device 100 determines the pixel values associated with the lips in X direction, pixel values associated with the lips in Y direction, and X-position and Y-position of the lips in the first facial descriptor coordinates generated based on the image frame captured in real-time at operation 702b.

Further, at operation 708a, the electronic device 100 determines a change in the X and Y relative positions, a change in pixel intensities and a change in X and Y distance between the lips in the second facial descriptor coordinates and the lips in the first facial descriptor coordinates. At operation 710b and at operation 712b, the electronic device 100 determines the histogram visualization for the lips captured in the second facial descriptor coordinates and the first facial descriptor coordinates respectively. Further, the electronic device 100 determines the weight for the lips as 0.3 based on the change undergone by the lips in the second facial descriptor coordinates and the first facial descriptor coordinates.

Figure 7D:
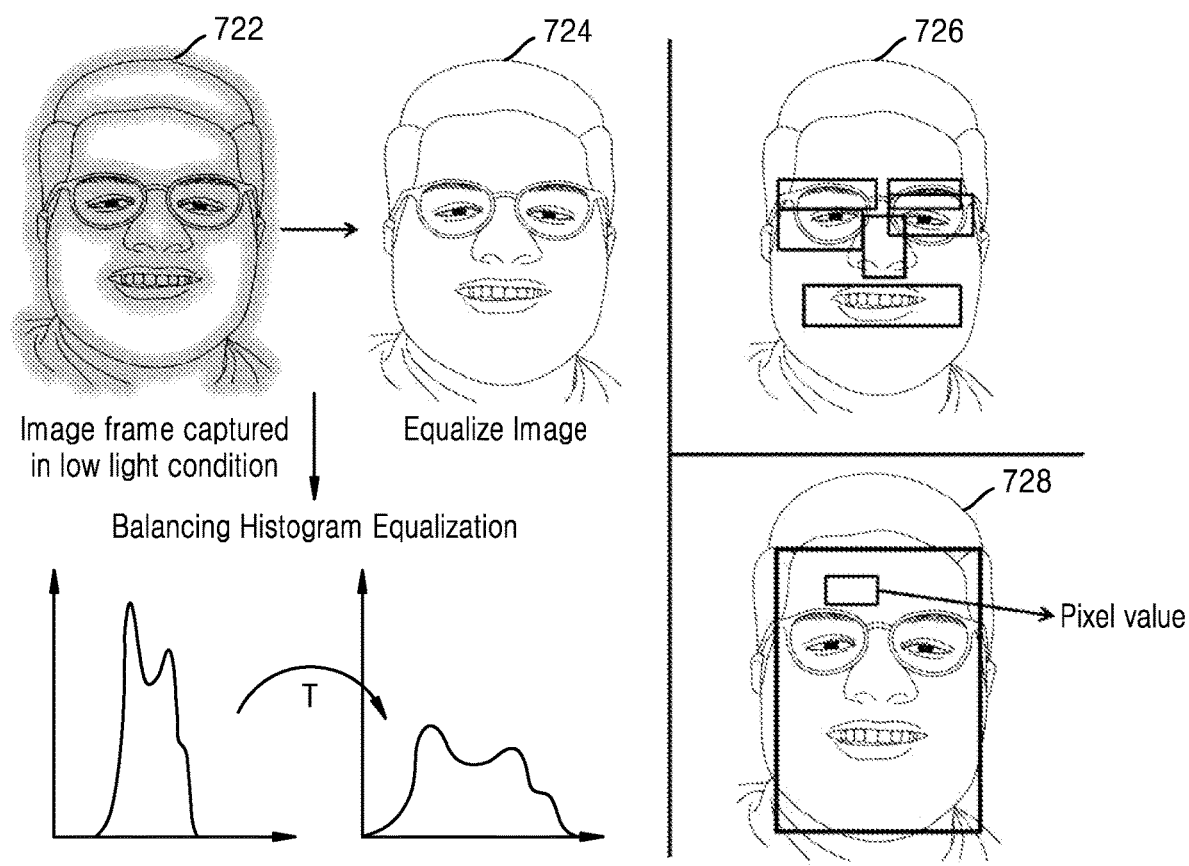
FIG. 7D illustrates facial mimic identification based on the weight associated with the facial descriptors by the electronic device, according to one or more embodiments.

FIG. 7D illustrates facial mimic identification based on the weight associated with the facial descriptors by the electronic device 100, according to one or more embodiments. In FIG. 7D, at operation 722 the electronic device 100 captures the image frame of the portion of the user's face in low light condition and at operation 724 the electronic device 100 performs balancing histogram equalization to obtain the image frame as shown in the operation 724.

Further, at operation 726 the electronic device 100 determines the facial mimic based on the weight distribution as:

Facial Mimic Identification=Σ(0.3*f(Eyebrow)), (0.3*f(Lips)),(0.08*(f(Eyes)+f(Hairs)+f(Cheeks)+ f(Nose)+f(Chin))) (12)

where f(facial descriptor) is the contribution of the facial descriptor in the identification of the mimic.

At operation 728, the electronic device 100 determines the pixel value by creating a 8*8 gird and capture pixel value for every grid as:

PixelValue=(RGB$_{value}$ PerPixel)−Σ(RGB$_{value}$ 4−NeibourPixel)/4 (13)

Pixel Value may be defined as average value of a pixel with 4-neighbor pixels. RGB$_{value}$ per pixel may be a RGB value of that particular pixel and RGB$_{value}$ 4-neighbour Pixel may be 4 nearby pixels. The electronic device 100 also trains 64 Pixels for every face and applies the facial descriptor CNN 146.

FIG. 8A illustrates resizing the first facial descriptor coordinates radially based on the first distance and the weight associated with the facial descriptors by the electronic device 100, according to one or more embodiments. In FIG. 8A, the electronic device 100 after determining the first distance between the first facial descriptor coordinates (circle dots) and the second facial descriptor coordinates (triangle dots) proceeds to reshape the first facial descriptor coordinates with respect to the second facial descriptor coordinates.

At operation 802, the electronic device 100 determines the weight associated with each of the facial descriptors used to generate the first facial descriptor coordinates (circle dots). Further, the electronic device 100 reshapes the first facial descriptor coordinates radially with respect to the second facial descriptor coordinates based on the first distance and the weight associated with each of the facial descriptors. The reshaping of the position of the first facial descriptor coordinates based on the weights is to accommodate the more contributing facial descriptors which expands/shrinks more gradually (such as for example eyebrows or lips) rather than less contributing facial descriptors (such as for example eyes or nose).

At 802, the points above middle of the nose shift upwards with "S-Shift" which is the first distance. The shift of the eyebrows for example is calculated as:

$$FacePoint'_{Eyebrow_X} = X_{position} * \left| \frac{FacePoint_{Eyebrow_X}}{ActualownerBoundingBox_{Eyebrow_X}} \right| \quad (14)$$

$$FacePoint'_{Eyebrow_Y} = Y_{position} * \left| \frac{FacePoint_{Eyebrow_Y}}{ActualownerBoundingBox_{Eyebrow_Y}} \right| \quad (15)$$

$$Resize_{Eyebrow_X} = FacePoint'_{Eyebrow_X} + (S*W), \text{ where } W = 0.30 \quad (16)$$

where W is a facial descriptor weight. And W may be a theoretical static value. For example, W of eyebrows may be 0.30.

At 804, the points above the middle position of the nose shift upwards with "S-Shift" which is the first distance. The shift of the chin for example is calculated as:

$$FacePoint'_{Chin_X} = X_{position} * \left| \frac{FacePoint_{Chin_X}}{ActualownerBoundingBox_{Chin_X}} \right| \quad (17)$$

$$FacePoint'_{Chin_Y} = Y_{position} * \left| \frac{FacePoint_{Chin_Y}}{ActualownerBoundingBox_{Chin_Y}} \right| \quad (18)$$

$$Resize_{Chin_X} = FacePoint'_{Chin_X} + (S*W), \text{ where } W = 0.08 \quad (19)$$

At 806, the overall radial shift/reshape of the first facial descriptor coordinates with respect to the second facial descriptor coordinates are provided.

Figure 8B:
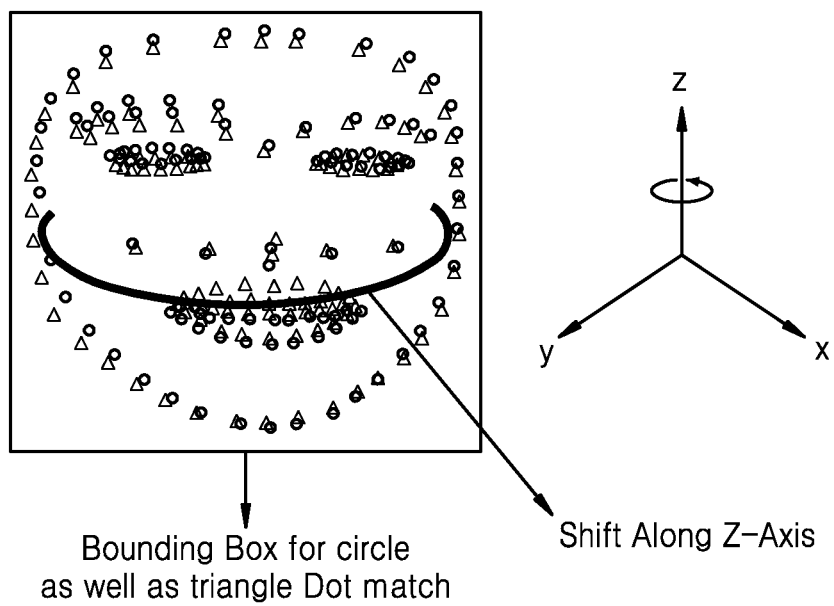
FIG. 8B illustrates resizing the first facial descriptor coordinates using angular rotation along z-axis by the electronic device, according to one or more embodiments.

FIG. 8B illustrates resizing the first facial descriptor coordinates using the angular rotation along the z-axis he electronic device 100, according to one or more embodiments. In FIG. 8B, when the electronic device 100 resizes the first facial descriptor coordinates radially, the upper portion of the eyes and the eyebrows shift in the upper direction while the lower portion of the eyes and the eyebrows shift in the lower direction radially.

Further, the electronic device 100 determines the angle of rotation of the reshaped first facial descriptor coordinates in comparison to the second facial descriptor coordinates. The reshaping is performed by considering the nasal midpoint of the second facial descriptor coordinates (triangle dots) as actual point and the first facial descriptor coordinates (circle dots) as test point and rotating by the electronic device 100 the second facial descriptor coordinates towards left direction or right direction based upon the nose midpoint. The circle dots face are shifted along Z-axis with 0 degree till equal size facial bounding box is created for the circle dots with respect to the triangle dots.

Figure 9:
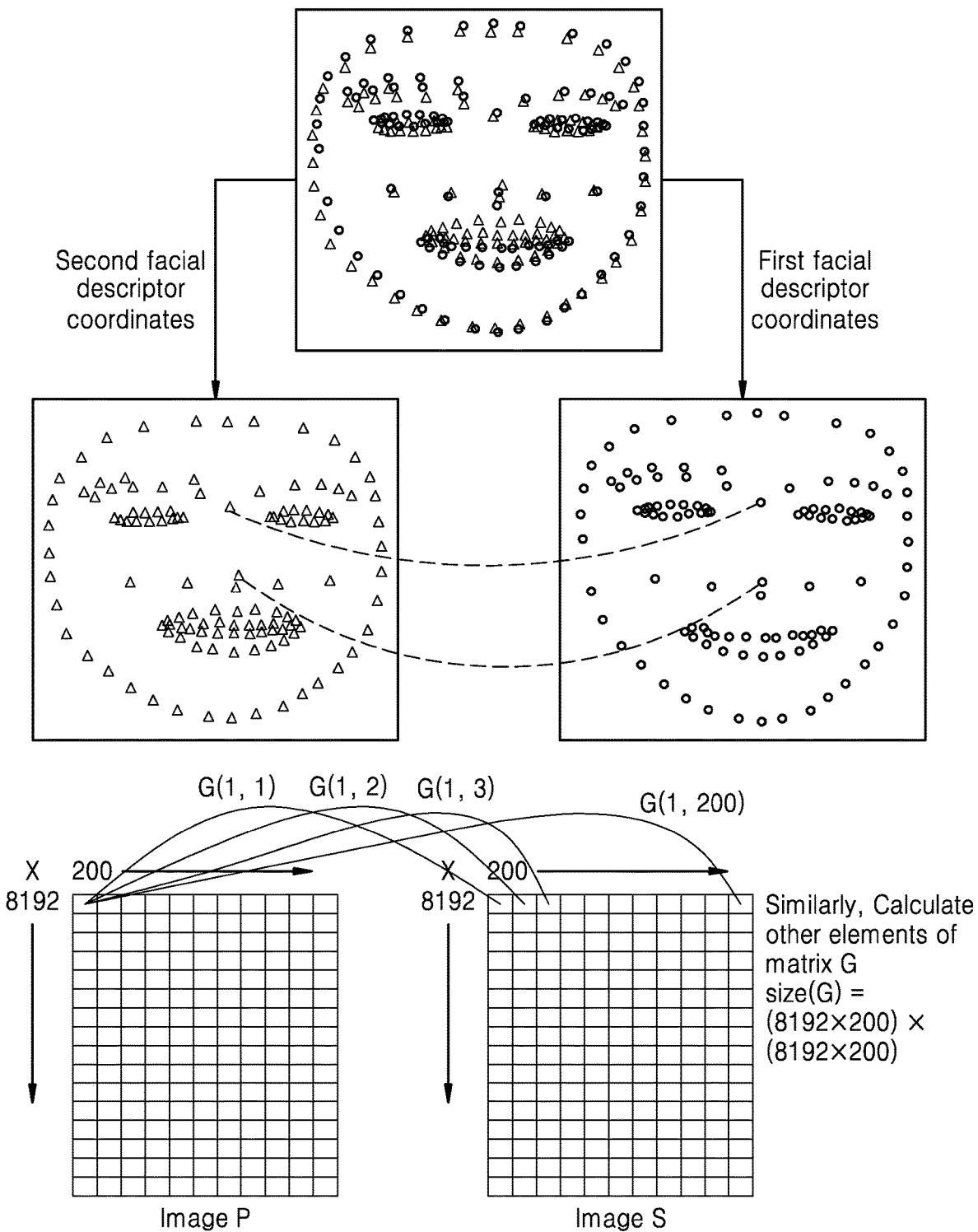
FIG. 9 illustrates determination of a second distance between the first facial descriptor coordinates and the second facial descriptor coordinates by the electronic device, according to one or more embodiments.

FIG. 9 illustrates the determination of the second distance between the first facial descriptor coordinates and the second facial descriptor coordinates by the electronic device 100, according to one or more embodiments. In FIG. 9, the electronic device 100 determines the second distance which may be for example a L2 Distance with respect to every facial descriptor between the first facial descriptor coordinates and the second facial descriptor coordinates. The L2 distance is determined once the facial bounding box of the first facial descriptor coordinates and the facial bounding box of the second facial descriptor coordinates are equal.

The electronic device 100 calculates a distance of the vector coordinate from an origin of vector space for each of the facial descriptors. The L2 distance may also be calculated as the Euclidean distance from the origin. The result is a positive distance value.

$$L_2 \text{Distance} = \sqrt{\Sigma_{i=0}^{n} \Sigma_{j=0}^{m} (a_{ij} - b_{ij})^2} \quad (20)$$

$A=(a_{ij})$: Matrices of A
$B=(b_{ij})$: Matrices of B

Here, the matrices of A relate to the first facial descriptor coordinates and the matrices of B relate to the second facial descriptor coordinates. The matrices of A and the matrices of B are of M*1 dimensional matrix.

Figure 10:
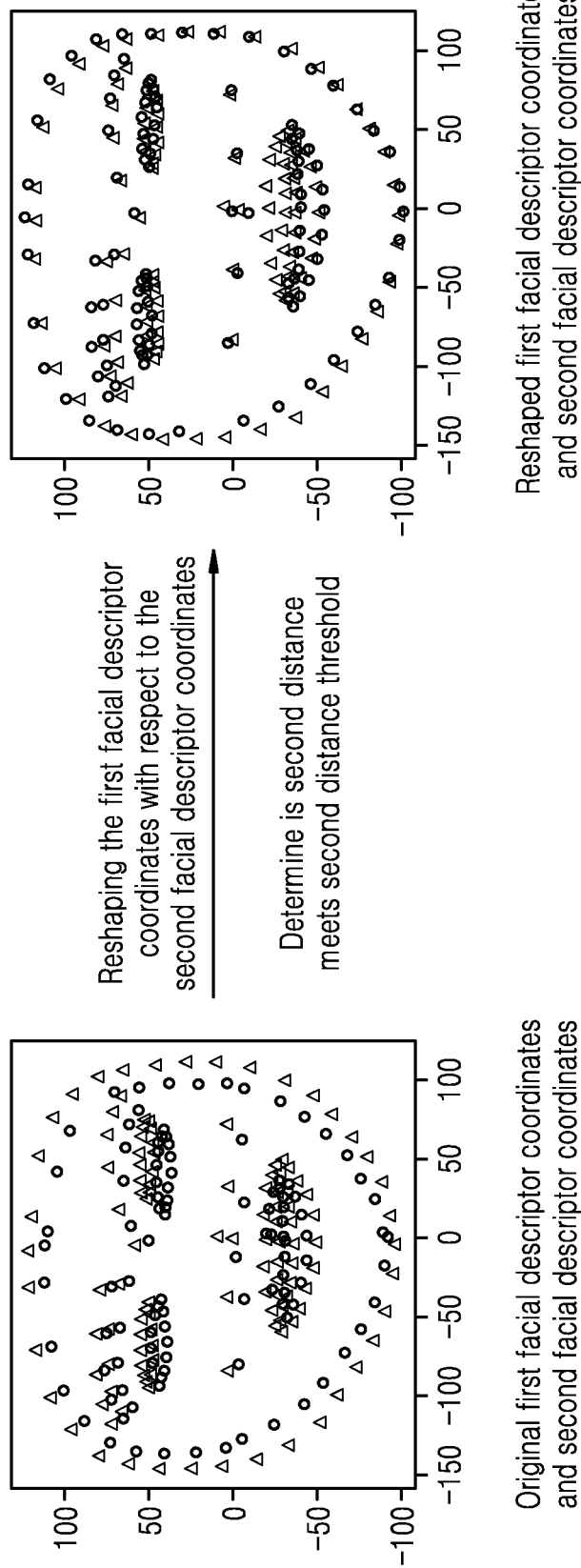
FIG. 10 illustrates identification of the user based on the second distance meeting a second distance threshold by the electronic device, according to one or more embodiments.

FIG. 10 illustrates the identification of the user based on the second distance meeting the second distance threshold by the electronic device 100, according to one or more embodiments. In FIG. 10, in conjunction with FIG. 9, the electronic device 100 selects the second distance threshold (L2 distance threshold) which is used to identify the user. The second distance threshold may be determined based on the learning by the electronic device 100 at the time of registering the user. Further, the electronic device 100 determines whether the second distance between the resized first facial descriptor coordinates and the second facial descriptor coordinates meets the second distance threshold. Further, the electronic device 100 identifies the user when the second distance meets the second distance threshold.

For example, when the second distance value is greater than or equal to the second distance threshold, then the user may be identified to be the mimic of the real-user. This is because the second distance indicates a level to which the image frame captured in real-time is identical to the image frame captured at the time of registration of the user based on the facial descriptor coordinates generated by the electronic device 100. Higher the second distance, higher is the difference between the first facial descriptor coordinates and the second facial descriptor coordinates which means that the image frame obtained in real-time does not belong to the user registered with the electronic device 100.

Figure 11A:
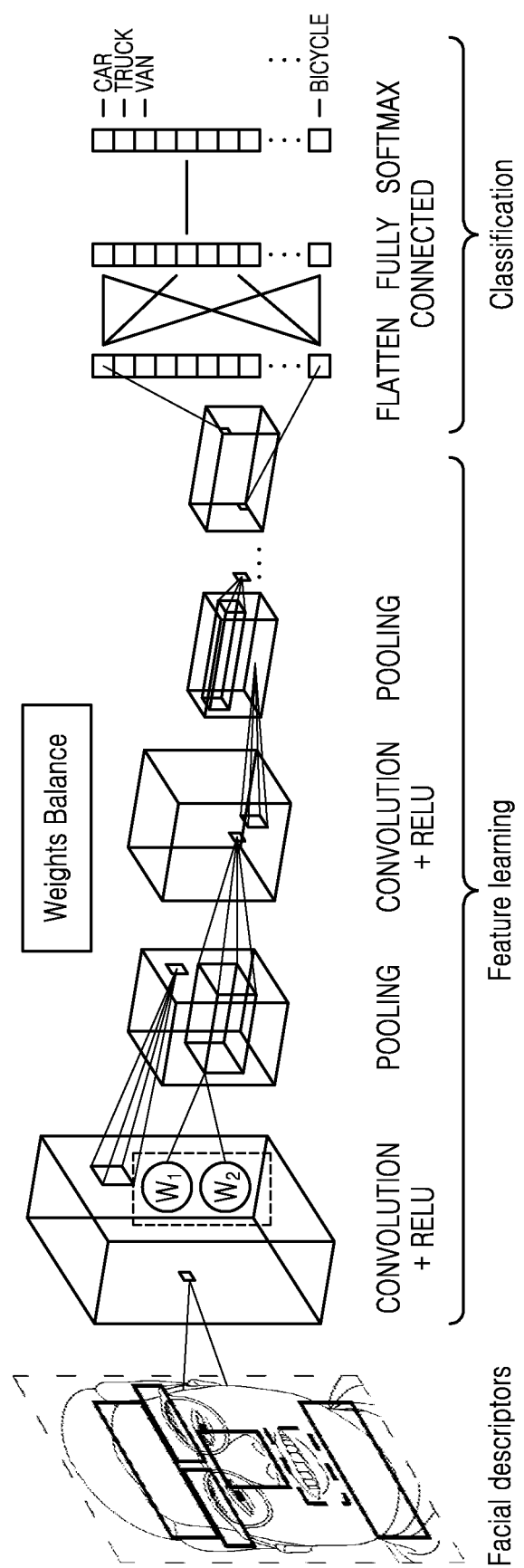
FIG. 11A illustrates an architecture for identifying the attentiveness of the user by the electronic device, according to one or more embodiments.

FIG. 11A illustrates an architecture for identifying the attentiveness of the user by the electronic device 100, according to one or more embodiments. In FIG. 11A, the architecture of the facial descriptor CNN 146 for identifying the attentiveness of the user by the electronic device 100 is provided. In existing neural networks, the input image data is directly mapped with output variables. Unlike to the existing neural networks, in the proposed method the extracted facial descriptors which define the user's behavioral and cognitive information are provided as input to the facial descriptor CNN 146.

For example, the facial descriptor CNN 146 includes the below:

| | | | | | | | | | |
|---|---|---|---|---|---|---|---|---|---|
| [2 | × | CONV | (3×3)] | – | MAXP | (2×2) | – | DROPOUT | (0.4) |
| [2 | × | CONV | (3×3)] | – | MAXP | (2×2) | – | DROPOUT | (0.4) |
| [2 | × | CONV | (3×3)] | – | MAXP | (2×2) | – | DROPOUT | (0.4) |
| [2 | × | CONV | (3×3)] | – | MAXP | (2×2) | – | DROPOUT | (0.4) |
| Dense | | (512) | | – | | DROPOUT | | | (0.4) |
| Dense | | (256) | | – | | DROPOUT | | | (0.4) |
| Dense (128) - DROPOUT (0.4). | | | | | | | | | |

In the proposed facial descriptor CNN 146 in first convolutional layer, L2 regularization (0.01) is added. All convolutional layers except the first convolutional layer, batch normalization layer is provided. MAXP (2×2) and DROPOUT (0.5) layers have been added to each convolutional layers block. "RELU" is used as activation function for all convolutional layers.

The facial attentiveness of the user is determined by creating a dataset of 32400 grayscale images where size of each image is 96*96 pixel values=9216 pixel value data where the data of each is mapped with a type of attentiveness posture. A size of dataset may be variable such as for example 300 different people with 18 images of 6 type of facial posture (Sleepy, Happy, Sad, Surprise, Fear, and Neutral): 300*18*6=32400 images dataset. Further, the dataset is filtered for each user with two usage manuals as normalize image and resize the normalized image. Further, the pixel values from the grayscale image are obtained and the output is converted into a categorical label matrix.

Figure 11B:
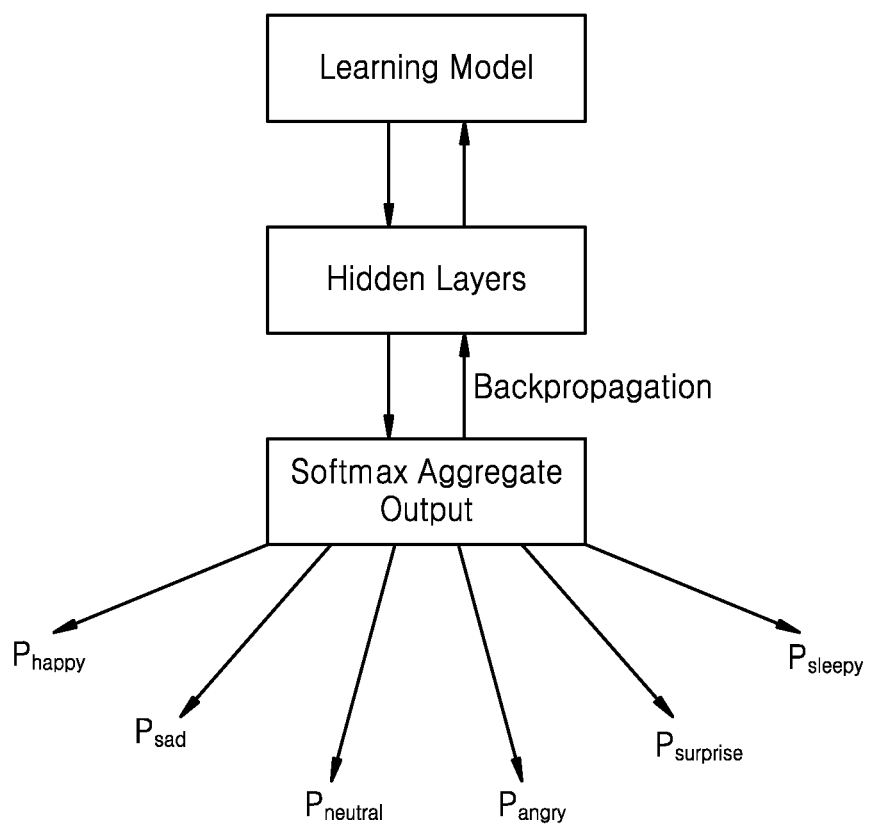
FIG. 11B illustrates a method for obtaining probabilistic output for each facial descriptor extracted by the electronic device, according to one or more embodiments.

FIG. 11B illustrates a method for obtaining probabilistic output for each facial descriptor extracted by the electronic device 100, according to one or more embodiments. In FIG. 11B, the output of the facial descriptor CNN 146 is provided to softmax function of the identification controller 148. The identification controller 148 normalizes the output of the facial descriptor CNN 146 to fall between zero and one. Further, the identification controller 148 represents the probability of a certain network output.

The normalization is calculated by dividing the exponential value of the output of the facial descriptor CNN 146 by a summation of the exponential value of each possible output.

For example, probabilistic output for each cognitive facial descriptor:

$$P_{Happy}+P_{Sad}+P_{Neutral}+P_{Angry}+P_{Surprise}+P_{Sleepy}=1 \quad (21)$$

The probability of attentiveness of the user's face may be determined using the $P_{Happy}$, and the $P_{nuetral}$ and the probability of inattentiveness of the user's face may be determined using the $P_{sad}$, $P_{angry}$, $P_{sleepy}$, and $P_{surprise}$.

For example, if $P_{Attentiveness}>0.70$: user is Attentive
For example, if $P_{Inattentiveness}>0.70$: user is Not Attentive Therefore, in the proposed method once the second distance is determined as meeting the second distance threshold or not, the output can be used for example in determining the attentiveness of the user.

Figure 11C:
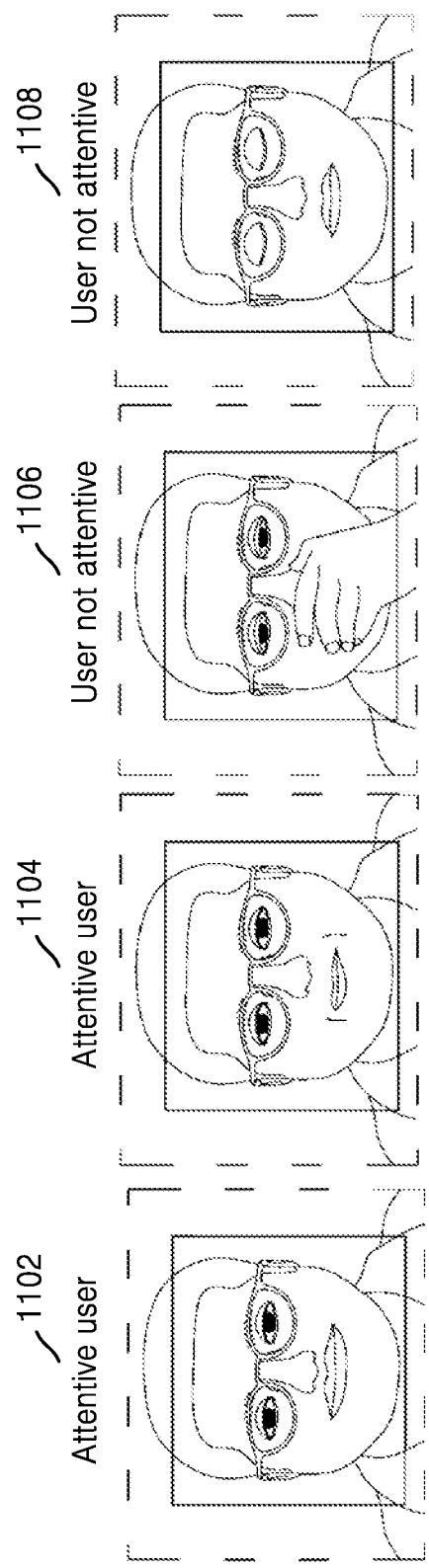
FIG. 11C are examples illustrating the attentiveness of the user of the electronic device, according to one or more embodiments.

FIG. 11C are examples illustrating the attentiveness of the user of the electronic device 100, according to one or more embodiments. In FIG. 11C, in conjunction with FIG. 11B, various examples of the user's attentiveness detection based upon the facial descriptors is provided. At 1102 and 1104, the electronic device 100 determines that the user is smiling or neutral and hence identifies the user as attentive. At 1106 the electronic device 100 determines that the user is surprised or sad and hence identifies the user as inattentive.

Similarly, at 1108 the electronic device 100 determines that the user is sleepy or sad and hence identifies the user as inattentive.

Therefore, the proposed method uses identification of the user from the facial descriptors and determine whether the user is actually providing consent for example to unlock the electronic device 100, identify an intention of the user from the behavioral traits which is used to check that user is focused for unlock or not.

Figure 12A:
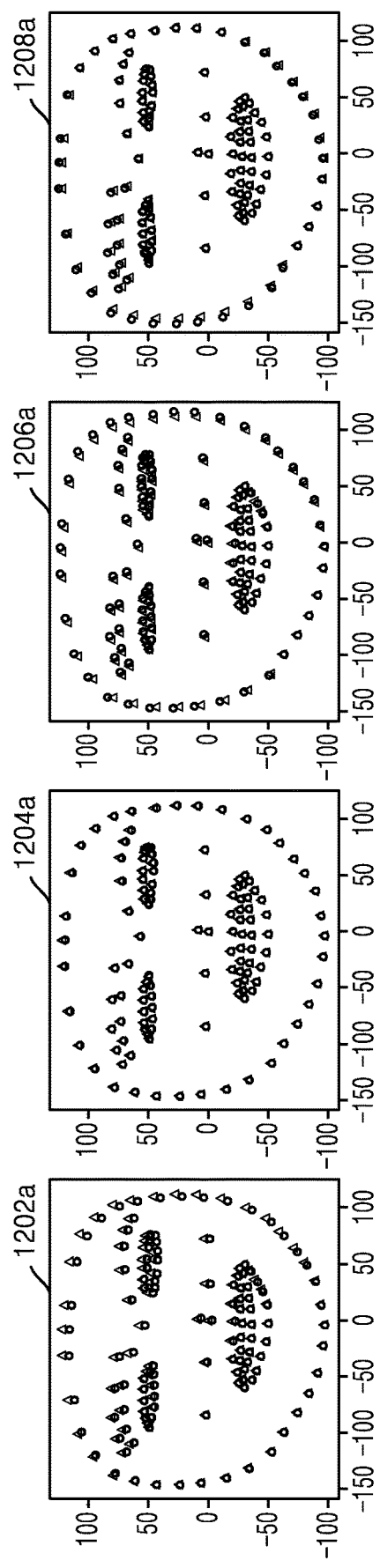
FIG. 12A are examples illustrating the first facial descriptor coordinates with respect to the second facial descriptor coordinates for the real user as determined by the electronic device, according to one or more embodiments.

FIG. 12A are examples illustrating the first facial descriptor coordinates with respect to the second facial descriptor coordinates for the real user as determined by the electronic device 100, according to one or more embodiments. In FIG. 12A, consider that the electronic device 100 captures the image frames of a user 1 who is registered with the electronic device 100 in various scenarios as shown in 1202a-1208a.

In each of the scenarios the electronic device 100 generates the first facial descriptor coordinates for the image frame captured which is represented by the circle dots In FIG. 12A. Since the user 1 is registered with the electronic device 100, the second facial descriptor coordinates is stored in the electronic device 100 as shown by the triangle dots In FIG. 12A. The electronic device 100 after capturing the image frames of the user 1 in each of the scenarios determines the second distance between the resized first facial descriptor coordinates and the second facial descriptor coordinates. From FIG. 12A, the resized first facial descriptor coordinates and the second facial descriptor coordinates are identical and hence the second distance meets the second distance threshold. Therefore, the electronic device 100 identifies the user 1 in each of the scenarios.

Figure 12B:
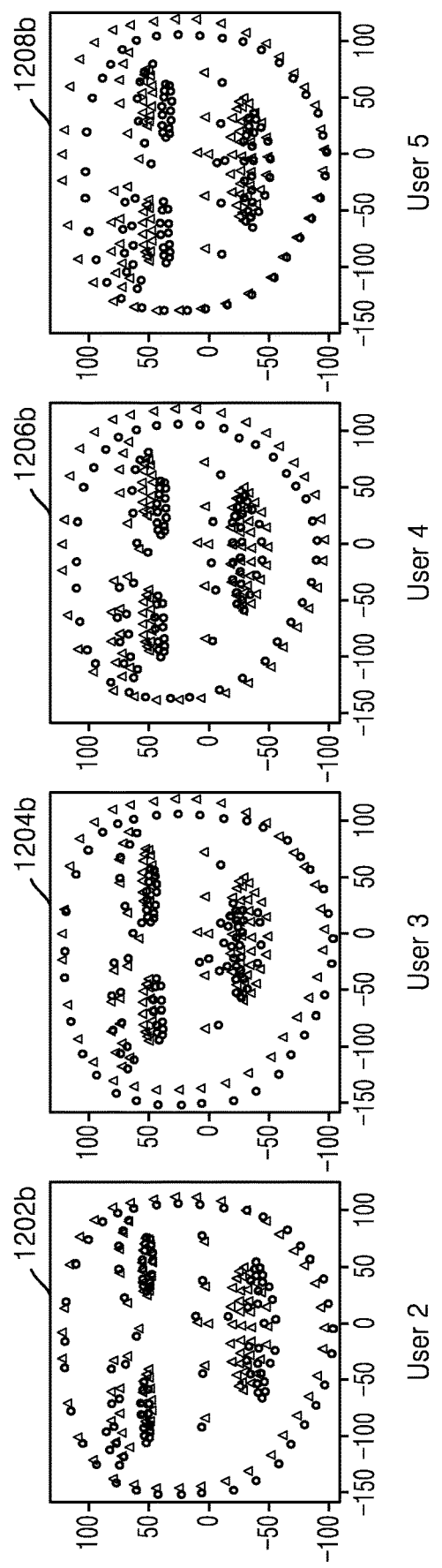
FIG. 12B are examples illustrating the first facial descriptor coordinates with respect to the second facial descriptor coordinates for a mimic of the user as determined by the electronic device, according to one or more embodiments.

FIG. 12B are examples illustrating the first facial descriptor coordinates with respect to the second facial descriptor coordinates for the mimic of the user as determined by the electronic device 100, according to one or more embodiments. In FIG. 12B, in conjunction with FIG. 12A, consider various scenarios as shown in 1202b-1208b where a user 2, a user 3, a user 4 and a user 5's image frames are captured by the electronic device 100.

In each of the scenarios the electronic device 100 generates the first facial descriptor coordinates for the image frame captured which is represented by the circle dots In FIG. 12B. However, the user 1 is registered with the electronic device 100 and hence the second facial descriptor coordinates stored in the electronic device 100 as shown by the triangle dots In FIG. 12B belongs to the user 1.

Further, the electronic device 100 in each of the scenarios determines the second distance between the resized first facial descriptor coordinates (for each of the user) and the second facial descriptor coordinates of the user 1 stored in the electronic device 100. From FIG. 12B, the resized first facial descriptor coordinates (for each of the user) and the second facial descriptor coordinates are not identical and hence the second distance does not meet the second distance threshold. Therefore, the electronic device 100 does not identify any of the user 2, the user 3, the user 4 and the user 5 as the user registered with the electronic device 100 is the user 1.

Figure 12C:
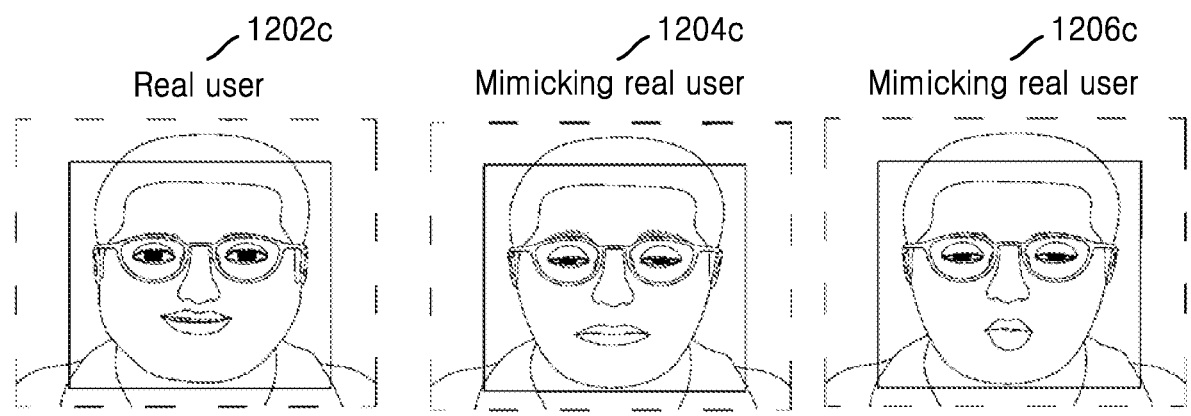
FIG. 12C are examples illustrating identification of the mimic of the user of the electronic device, according to one or more embodiments.

FIG. 12C are examples illustrating identification of the mimic of the user of the electronic device 100, according to one or more embodiments. In FIG. 12C in conjunction with FIG. 12A and FIG. 12B, at operation 1202c, consider that the electronic device 100 captures the image frame of the user 1 who is registered with the electronic device 100. The electronic device 100 generates the first facial descriptor coordinates and identifies the user 1 with respect to the second facial descriptor coordinates of the user 1 stored in the electronic device 100.

At operation 1204c, consider that the electronic device 100 captures the image frame of the mimic of the user 1 and generates the first facial descriptor coordinates. Further, the mimic tries to appear like the user 1 by manipulating the eyes and lips which are detected by the electronic device 100 based on the weights associated with each of the facial descriptors used to generate the first facial descriptor coordinates.

Therefore, the electronic device 100 determines that the first facial descriptor coordinates does not belong to the user 1 based on the second distance between the first facial descriptor coordinates of the mimic and the second facial descriptor coordinates. Similarly, at operation 1206c the electronic device 100 does not identify the mimic of the user 1 as the electronic device 100 detects the mimic trying to appear like the user 1 by pouting and reducing the size of the eyes.

FIG. 13A are examples illustrating the first facial descriptor coordinates generated for the user in various scenarios by the electronic device 100, according to one or more embodiments. In FIG. 13A, consider various scenarios in which the portion of the user's face may be presented before the electronic device 100 for identifying the user. Such as at 1302a an image of the user is presented, 1302b a video of the user is presented, 1302c a sculpture of the user is presented and 1302d the user who is registered with the electronic device 100 is present in real-time. Further, at 1304a-1304d the respective first facial descriptor coordinates are generated and subsequent operations are performed to determine the second distance between the respective first facial descriptor coordinates and the second facial descriptor coordinate stored in the electronic device 100.

Further, the electronic device 100 determines that only the first facial descriptor coordinates generated at the 1304d meets the second distance threshold and hence the electronic device 100 determines the user presented at 1302d as the genuine user.

Figure 13B:
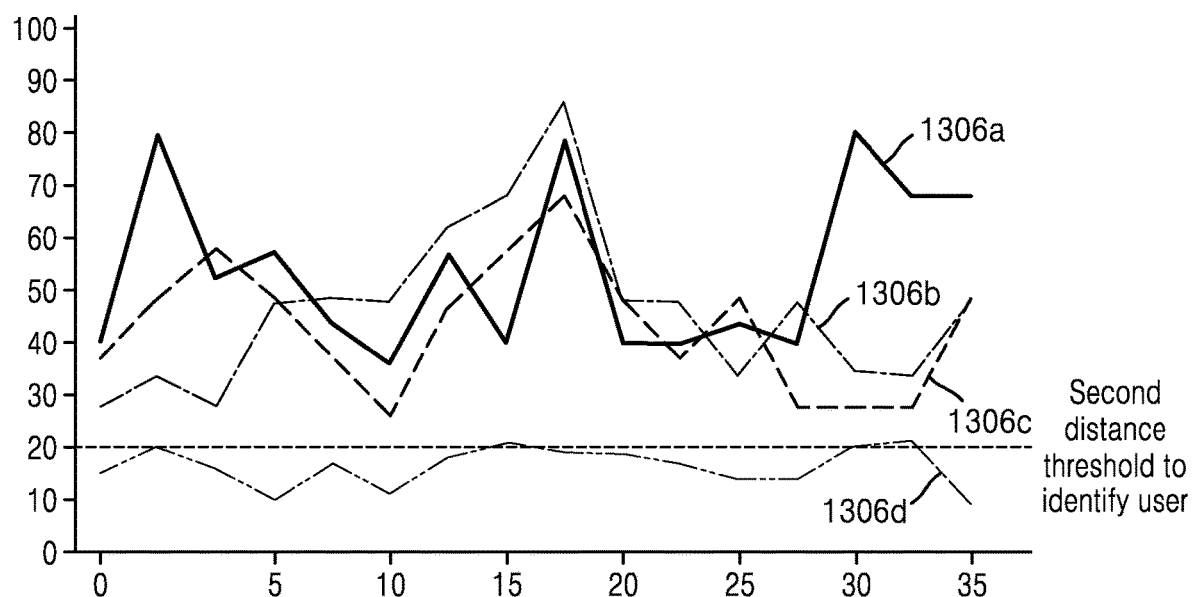
FIG. 13B is a graph plot illustrating an efficiency of identification of the various users by the electronic device, according to one or more embodiments.

FIG. 13B is a graph plot illustrating an efficiency of identification of the various users by the electronic device 100, according to one or more embodiments. In FIG. 13B, in conjunction with FIG. 13A, the graph plot represents an output for the various scenarios in which the portion of the user's face is presented before the electronic device 100 for identifying the user.

In the graph plot, 1306a represents the image of the user, 1306b represents the video of the user, 1306c represents the sculpture of the user and 1302d represents the user who is registered with the electronic device 100 in real-time. The second distance threshold gap between the graphs of each of the various scenarios in which the portion of the user's face is presented before the electronic device 100 shows that the electronic device 100 efficiently identifies and differentiates the mimicking.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for identifying a user of an electronic device, the method comprising:
    capturing at least one image frame of a portion of a face of the user;
    extracting facial descriptors from the at least one image frame of the portion of the face of the user;
    generating first facial descriptor coordinates based on the facial descriptors;

determining a first distance between the first facial descriptor coordinates and second facial descriptor coordinates, wherein the second facial descriptor coordinates are generated based on registering the user of the electronic device;

resizing the first facial descriptor coordinates at least one of radially and angularly based on the first distance between the first facial descriptor coordinates and the second facial descriptor coordinates, and a weight associated with each of the facial descriptors used to generate the first facial descriptor coordinates;

determining a second distance between the resized first facial descriptor coordinates and the second facial descriptor coordinates;

identifying whether the second distance between the resized first facial descriptor coordinates and the second facial descriptor coordinates is less than a second distance threshold; and identifying the user of the electronic device based on the second distance between the resized first facial descriptor coordinates and the second facial descriptor coordinates being less than the second distance threshold.

2. The method of claim 1, wherein the at least one image frame of the portion of the face of the user is captured with an environment around the portion of the face of the user, and wherein the portion of the face of the user and the environment around the portion of the face of the user is differentiated based on at least one of brightness and color composition.

3. The method of claim 1, wherein the extracting the facial descriptors from the at least one image frame of the portion of the face of the user comprises:

enhancing at least one of a quality and a lighting condition associated with the at least one image frame of the portion of the face of the user to generate at least one enhanced image frame of the portion of the face of the user;

determining a position and dimension of each of the facial descriptors from the at least one enhanced image frame of the portion of the face of the user; and extracting the facial descriptors from the at least one enhanced image frame of the portion of the face of the user.

4. The method of claim 1, wherein the identifying the user of the electronic device comprises:

determining whether the second distance between the resized first facial descriptor coordinates and the second facial descriptor coordinates is less than the second distance threshold; and identifying the user as one of:

genuine, based on determining that the second distance between the resized first facial descriptor coordinates and the second facial descriptor coordinates is greater than the second distance threshold, and not genuine, based on determining that the second distance between the resized first facial descriptor coordinates and the second facial descriptor coordinates is less than the second distance threshold.

5. The method of claim 1, wherein the facial descriptors comprises at least one of eyes, eyeballs, nose, mouth, ear, forehead, eyebrows, chin, lips, face lob, hair, and cheeks.

6. The method of claim 1, wherein the generating the first facial descriptor coordinates comprises:

obtaining the facial descriptors extracted from the at least one image frame of the portion of the face of the user;

combining the facial descriptors associated using a predefined facial coordinate; and generating the first facial descriptor coordinates based on the facial descriptors.

7. The method of claim 1, wherein the identifying the user of the electronic device comprises:

determining a probability of at least one attentiveness feature of the face of the user based on one of: the second distance between the resized first facial descriptor coordinates and the second facial descriptor coordinates being less than the second distance threshold and a distance between an original position of eyeballs of the user and a real-time position of eyeballs of the user;

determining a probability of at least one inattentiveness feature of the face of the user based on one of: the second distance between the resized first facial descriptor coordinates and the second facial descriptor coordinates being less than the second distance threshold, and the distance between the original position of eyeballs of the user and the real-time position of eyeballs of the user;

determining whether the probability of the at least one attentiveness feature is greater than the probability of the at least one inattentiveness feature; and determining that one of:

the face of the user is attentive, in response to determining that the probability of the at least one attentiveness feature is greater than the probability of the at least one inattentiveness feature, and the face of the user is not attentive, in response to determining that the probability of the at least one attentiveness feature is not greater than the probability of the at least one inattentiveness feature.

8. The method of claim 1, wherein the identifying the user of the electronic device comprises:

determining whether that the second distance between the resized first facial descriptor coordinates and the second facial descriptor coordinates is less than the second distance threshold; and identifying that one of:

the face of the user is not a facial mimic, based on determining that the second distance between the resized first facial descriptor coordinates and the second facial descriptor coordinates is greater than the second distance threshold, and the face of the user is the facial mimic, based on determining that the second distance between the resized first facial descriptor coordinates and the second facial descriptor coordinates is less than the second distance threshold.

9. The method of claim 1, wherein the resizing the first facial descriptor coordinates comprises:

determining the weight associated with each of the facial descriptors used to generate the first facial descriptor coordinates, based on a position and motion of a facial descriptor with respect to each of other facial descriptors;

reshaping the first facial descriptor coordinates radially over the second facial descriptor coordinates based on the first distance and the weight associated with each of the facial descriptors, wherein reshaping is one of expanding a size of the first facial descriptor coordinates and shrinking the size of the first facial descriptor coordinates;

determining an angle of rotation of the reshaped first facial descriptor coordinates in comparison to the second facial descriptor coordinates; and resizing the reshaped first facial descriptor coordinates by rotating the reshaped first facial descriptor coordinates using the determined angle of rotation until a facial boundary box of the reshaped first facial descriptor coordinates matches a facial boundary box of the second facial descriptor coordinates.

10. The method of claim 1, wherein the first distance is one of a positive value and a negative value based on a first distance threshold, and
wherein the first distance indicates a position of the user with respect to the electronic device.

11. The method of claim 10, wherein the positive value of the first distance indicates that the position of the user is away from the electronic device and the negative value of the first distance indicates that the position of the user is close to the electronic device.

12. An electronic device for identifying a user, the electronic device comprising:
a memory;
at least one processor coupled to the memory and configured to:
capture at least one image frame of a portion of a face of the user;
extract facial descriptors from the at least one image frame of the portion of the face of the user;
generate first facial descriptor coordinates using the facial descriptors;
determine a first distance between the first facial descriptor coordinates and second facial descriptor coordinates, wherein the second facial descriptor coordinates are generated based on registering the user of the electronic device;
resize the first facial descriptor coordinates at least one of radially and angularly based on the first distance between the first facial descriptor coordinates and the second facial descriptor coordinates, and a weight associated with each of the facial descriptors used to generate the first facial descriptor coordinates;
determine a second distance between the resized first facial descriptor coordinates and the second facial descriptor coordinates;
identify whether the second distance between the resized first facial descriptor coordinates and the second facial descriptor coordinates is less than a second distance threshold; and
identify the user of the electronic device based on the second distance between the resized first facial descriptor coordinates and the second facial descriptor coordinates being less than the second distance threshold.

13. The electronic device of claim 12, wherein the at least one image frame of the portion of the face of the user is captured with an environment around the portion of the face of the user, and
wherein the portion of the face of the user and the environment around the portion of the face of the user is differentiated based on at least one of brightness and color composition.

14. The electronic device of claim 12, wherein the at least one processor is further configured to extract the facial descriptors from the at least one image frame of the portion of the face of the user by:
enhancing at least one of a quality and a lighting condition associated with the at least one image frame of the portion of the face of the user to generate at least one enhanced image frame of the portion of the face of the user;
determining a position and dimension of each of the facial descriptors from the at least one enhanced image frame of the portion of the face of the user; and
extracting the facial descriptors from the at least one enhanced image frame of the portion of the face of the user.

15. The electronic device of claim 12, wherein the at least one processor is further configured to identify the user of the electronic device by:
determining whether the second distance between the resized first facial descriptor coordinates and the second facial descriptor coordinates is less than the second distance threshold; and
identifying the user as one of:
genuine, based on determining that the second distance between the resized first facial descriptor coordinates and the second facial descriptor coordinates is greater than the second distance threshold, and
not genuine, based on determining that the second distance between the resized first facial descriptor coordinates and the second facial descriptor coordinates is less than the second distance threshold.

16. The electronic device of claim 12, wherein the facial descriptors comprises at least one of eyes, eyeballs, nose, mouth, ear, forehead, eyebrows, chin, lips, face lob, hair, and cheeks.

17. The electronic device of claim 12, wherein the at least one processor is further configured to generate the first facial descriptor coordinates by:
obtaining the facial descriptors extracted from the at least one image frame of the portion of the face of the user;
combining the facial descriptors associated using a predefined facial coordinate; and
generating the first facial descriptor coordinates based on the facial descriptors.

18. The electronic device of claim 12, wherein the at least one processor is further configured to identify the user of the electronic device by:
determining a probability of at least one attentiveness feature of the face of the user based on one of: the second distance between the resized first facial descriptor coordinates and the second facial descriptor coordinates being less than the second distance threshold and a distance between an original position of eyeballs of the user and a real-time position of eyeballs of the user;
determining a probability of at least one inattentiveness feature of the face of the user based on one of: the second distance between the resized first facial descriptor coordinates and the second facial descriptor coordinates being less than the second distance threshold, and the distance between the original position of eyeballs of the user and the real-time position of eyeballs of the user;
determining whether the probability of the at least one attentiveness feature is greater than the probability of the at least one inattentiveness feature; and
determining that one of:
the face of the user is attentive, in response to determining that the probability of the at least one attentiveness feature is greater than the probability of the at least one inattentiveness feature, and
the face of the user is not attentive, in response to determining that the probability of the at least one attentiveness feature is not greater than the probability of the at least one inattentiveness feature.

19. The electronic device of claim 12, wherein the at least one processor is further configured to identify the user of the electronic device by:
- determining whether that the second distance between the resized first facial descriptor coordinates and the second facial descriptor coordinates is less than the second distance threshold; and
- identifying that one of:
  - the face of the user is not a facial mimic, based on determining that the second distance between the resized first facial descriptor coordinates and the second facial descriptor coordinates is greater than the second distance threshold, and
  - the face of the user is the facial mimic, based on determining that the second distance between the resized first facial descriptor coordinates and the second facial descriptor coordinates is less than the second distance threshold.

20. A non-transitory computer-readable recording medium having recorded thereon a program that is executable by a process to perform the method of claim 1.

* * * * *